(12) United States Patent
Kanoshima et al.

(10) Patent No.: US 6,571,071 B2
(45) Date of Patent: May 27, 2003

(54) CONSUMPTION INFORMATION MANAGEMENT APPARATUS, IMAGE FORMATION APPARATUS, AND CONSUMPTION INFORMATION MANAGEMENT SYSTEM

(75) Inventors: Yuichiro Kanoshima, Ohta-ku (JP); Kohji Ichimiya, Ohta-ku (JP); Satoshi Igari, Ohta-ku (JP); Mamoru Kiyota, Ohta-ku (JP); Nekka Matsuura, Ohta-ku (JP); Yasuyuki Shinkai, Ohta-ku (JP); Makoto Obu, Chiisagatagun (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/963,429

(22) Filed: Sep. 27, 2001

(65) Prior Publication Data

US 2002/0037177 A1 Mar. 28, 2002

(30) Foreign Application Priority Data

Sep. 28, 2000 (JP) .......................... 2000-296039
Sep. 21, 2001 (JP) .......................... 2001-290167

(51) Int. Cl.$^7$ ................................. G03G 21/02
(52) U.S. Cl. ..................... 399/79; 399/24; 399/27
(58) Field of Search ....................... 399/8, 11, 24, 399/25, 26, 27, 79

(56) References Cited

U.S. PATENT DOCUMENTS

| | | | |
|---|---|---|---|
| 4,186,341 A | * 1/1980 | Noguchi et al. | ........... 399/27 |
| 4,696,255 A | 9/1987 | Yano et al. | |
| 4,760,422 A | 7/1988 | Seimiya et al. | |
| 4,930,438 A | 6/1990 | Demizu et al. | |
| 5,172,169 A | 12/1992 | Takashima et al. | |
| 5,210,571 A | * 5/1993 | Peloguin et al. | ........... 399/11 |
| 5,220,383 A | 6/1993 | Enoki et al. | |
| 5,239,344 A | 8/1993 | Enoki et al. | |
| 5,245,391 A | 9/1993 | Suzuki et al. | |
| 5,286,918 A | 2/1994 | Iwata et al. | |
| 5,311,263 A | 5/1994 | Suzuki et al. | |
| 5,389,733 A | 2/1995 | Enoki et al. | |
| 5,394,231 A | 2/1995 | Sudo et al. | |
| 5,451,713 A | 9/1995 | Suzuki et al. | |
| 5,474,869 A | 12/1995 | Tomita et al. | |
| 5,508,794 A | 4/1996 | Ikesue et al. | |
| 5,627,630 A | 5/1997 | Matsumae et al. | |
| 5,674,408 A | 10/1997 | Suzuki et al. | |
| 5,741,616 A | 4/1998 | Hirano et al. | |
| 5,819,145 A | 10/1998 | Tanaka et al. | |
| 5,864,733 A | 1/1999 | Mae et al. | |
| 5,873,009 A | * 2/1999 | Yamashita et al. | ........... 399/8 |
| 6,052,547 A | * 4/2000 | Cuzzo et al. | ........... 399/79 |
| 6,385,675 B1 | * 5/2002 | Yamaguchi | ........... 399/79 |

FOREIGN PATENT DOCUMENTS

| | | |
|---|---|---|
| JP | 6-3956 | 1/1994 |
| JP | 7-325514 | 12/1995 |
| JP | 9-160452 | 6/1997 |
| JP | 10-222032 | 8/1998 |
| JP | 11-84963 | 3/1999 |
| JP | 2000-19906 | 1/2000 |
| JP | 2001-69291 | 3/2001 |

* cited by examiner

Primary Examiner—Hoang Ngo
(74) Attorney, Agent, or Firm—Oblon, Spivak, McClelland, Maier & Neustadt, P.C.

(57) ABSTRACT

An integration density acquiring unit for a consumption information management apparatus acquires integration density from an image signal sent from an image processing section, and an information converting unit calculates a quantity of consumed toner (consumption information) by multiplying the integration density by a specified coefficient to send the quantity to a cumulative consumption information calculating unit. The cumulative consumption information calculating unit temporarily stores the information for the quantity of toner consumption in a memory, and reads out the information from the memory at predetermined timing. Accordingly, it is possible to determine only the cost for developer used by a user or calculate the quantity of developer remaining within an image formation apparatus based on the cumulative consumption information for the unadjusted developer stored in the memory.

43 Claims, 15 Drawing Sheets

SURFACE OF THE PHOTORECEPTOR

CONSUMPTION INFORMATION MANAGEMENT APPARATUS, IMAGE FORMATION APPARATUS, AND CONSUMPTION INFORMATION MANAGEMENT SYSTEM

FIELD OF THE INVENTION

The present invention relates to a consumption information management apparatus, an image formation apparatus, and a consumption information management system. More particularly, this invention relates to the consumption information management apparatus that manages consumption information for consumable items (supplies) such as paper and developer used in copiers, facsimiles, or printers and for a communication fee or the like, and the image formation apparatus provided with the consumption information management apparatus. This invention also relates to the consumption information management system that charges a user for the consumed supplies and a maintenance fee of the image formation apparatus.

BACKGROUND OF THE INVENTION

In recent years, a substantial use period of purchased products of various types has been shortened in association with acceleration of technological innovation. Therefore, users tend to use products always with the latest functions by lease or rental rather than purchase of such products whose use cycles are substantially short.

On the other hand, in order to cope with such situations, businesses providing products to users by lease or rental are increasing. Under such circumstances, the image forming devices such as the copiers, facsimiles, or the printers are thought to be provided increasingly to the users by lease or rental.

As for the image forming device based on rental, the user returns a device, which has been used up to that time, to the rental source and at the same time rents a new device in order to always use the device provided with the latest functions by making use of merits of the lease system or rental system.

However, in the conventional rental system of the image forming devices, supplies such as developer and paper are not included in a lease fee or a rental fee, so that the user purchases such supplies separately. Accordingly, when the user is to rent a new device, the supplies remaining inside the image forming device to be returned are also taken to the rental source although these supplies are not used by the user, which brings loss to the user. For example, when the supplies such as developer are supplied to the image forming device to be returned immediately before its return, almost all the supplied items are also taken to the rental source remaining unused.

In these types of image forming devices, properties of developer to be used are generally different from each other for each type of the image forming devices. Therefore, when the image forming device having been used up to that time is returned, there may occur such inconvenience that the developer purchased and stocked by the user as developer for this particular image forming device will be wasted.

Such disadvantages brought to the user in the rental system of the image forming device occur in both of monochrome image forming devices and color image forming devices, but the disadvantages are more significant particularly in the color image forming devices. That is, the color image forming device has developers of respective colors accommodated in a plurality of developer containers, and consumed quantities of the developers of the respective colors are different according to used situations by the user. Accordingly, possibility, such that this color image forming device has run out of the developers of the respective colors accommodated in the developer containers at the time of being returned, is extremely low as compared to that of the monochrome image forming device. Further, the color developers are generally used less frequently than the monochrome developer, but are more expensive.

Accordingly, when the color image forming device is returned, a large quantity of color developers not used frequently, in many cases, remains within the respective developer containers without being consumed. Therefore, when the image forming device is returned, there is a high possibility that the large quantity of developers remaining in the developer containers are also taken to the rental source. Therefore, the loss of the user becomes much larger as compared to that of the monochrome image forming device.

On the other hand, in recent years, it has been recognized, as an important matter, to recycle products and parts that have not yet reached the end of their lives considering the influence over the environments and resources due to disposal of various types of products. Based on such background, in the field of the image forming devices, when a user has purchased an image forming device and quits using it, it is thought to become common that its maker collects the image forming device and provide the device to recycling.

However, when the image forming device purchased and used by the user is provided to the maker as it is for its recycling, for the same reason as the case where the image forming device is rented, it is quite possible that disadvantages for the user may occur. That is, when the image forming device purchased and used by the user is to be collected by its maker, even if unused developer remains within the image forming device, this developer is also delivered to the maker together with the image forming device. If such a case occurs, the developer purchased by the user may be delivered to the maker remaining unused, which is wasteful for the user. This matter becomes more significant particularly in the color image forming device for the same reason as that of the rental image forming device.

Further, as described in Japanese Patent Application Laid-Open No. 09-160452, Japanese Patent Application Laid-Open No. 11-84963, and Japanese Patent Application Laid-Open No. 2000-19906, it is pointed out that a charging method based on the number of copies to be output, which has been conventionally performed in this type of image forming device, is unfair but charging based on the quantity of consumed toner is a fair and reasonable charging method. In such conventional technologies, a copying service charge is calculated based on the quantity of toner consumed through image formation. However, the point that the toner contained in the developer remaining within a developer container is resulted in charging to the user cannot be resolved by these technologies.

Conventionally, on the other hand, in order to maintain performance of the image forming device, the user may have paid for its maintenance, which is regularly performed, other than the expenses for purchase of the main body of the device or its rental fee. In such a case, as a running cost of the image forming device, the user is required to pay discretely for 1) a loan or a rental fee of the main body of the device, 2) a maintenance fee of the main body of the device, and 3) expenses for purchasing supplies such as developer. Therefore, the user has to manage complicated expenditures.

SUMMARY OF THE INVENTION

It is an object of this invention to provide a consumption information management apparatus capable of determining a charge for consumable items so that only supplies actually consumed for image formation are charged to the user, and an image formation apparatus provided with this consumption information management apparatus.

Another object of this invention is to provide a consumption information management system that charges the user of this image formation apparatus for any cost that is reasonable for the user.

According to one aspect of this invention, a consumption information acquisition unit acquires consumption information for the quantity of image visualizing agent consumed through image formation. A storage unit stores cumulative consumption information obtained by accumulating consumption information for an unadjusted quantity for the consumed quantity of image visualizing agent. The "image visualizing agent" mentioned here refers to media used to form an image through development, which includes not only a medium to directly form a visible image but also media contributing to the formed image by such a medium. For example, this image visualizing agent includes powder toner, carrier, liquid developer, a solvent to dilute the liquid developer, ink, an ink absorbing agent, and an ink reacting agent, or the like. The "consumption information" mentioned here refers to such information as a consumed quantity of image visualizing agent and a charge for the image visualizing agent, that is, any information that a charge for the image visualizing agent used by the user can be calculated. A charge determination unit can determine only the cost for the image visualizing agent consumed by the user based on the cumulative consumption information obtained by accumulating consumption information for unadjusted image visualizing agent stored in the storage unit.

Based on this cumulative consumption information, it is possible to calculate a quantity of the image visualizing agent remaining within the image formation apparatus. That is, the image visualizing agent for replacement in this type of image formation apparatus is generally stored by a specified quantity in a dedicated image visualizing agent container such as a toner bottle, a bottle for developing liquid, or an ink tank according to the system of each image formation apparatus. Therefore, the total quantity of the image visualizing agent supplied to the image formation apparatus can be calculated based on the number of replacing times of the image visualizing agent containers. Accordingly, it is possible to calculate the quantity of image visualizing agent remaining within the image formation apparatus by calculating the total quantity of image visualizing agent having been consumed in the image formation apparatus based on the cumulative consumption information and subtracting this consumed total quantity of image visualizing agent from the total quantity of image visualizing agent supplied to the image formation apparatus.

Further, the consumption information acquisition unit acquires consumption information based on one of those information for an amount of energy consumed by a writing unit, for a light emitting time of an optical writing unit, for a driving time of a toner conveying unit, for the number of rotation of a screw, and for ink jetting (Details will be explained later).

Further, a weight measurement unit capable of measuring a weight of an image visualizing agent container disposed in the image formation apparatus is provided within the image formation apparatus, and the consumption information is obtained by directly acquiring a change in weight of the image visualizing agent container by the weight measurement unit. Accordingly, the quantity of consumed image visualizing agent and its remaining quantity can be calculated.

Further, the consumption information is acquired at the time of turning ON and OFF the power to the main body of the image formation apparatus, or of opening and closing a cover that covers the image visualizing agent container. Accordingly, changes in weight of the image visualizing agent container can be directly acquired by measurement equipment without being affected by vibrations or the like because the time mentioned above is the time when the image formation apparatus does not operate. Therefore, it is possible to calculate accurate consumed quantity and remaining quantity of the image visualizing agent. It is also possible to accurately calculate the consumed quantity of the image visualizing agent and its remaining quantity when the image visualizing agent container is replaced.

Further, by setting an error in calculation of the quantity of consumed image visualizing agent to be within 10%, it is possible to accurately calculate a charge for used image visualizing agent.

Further, by setting a recording unit for the quantity of developer consumption stored in the storage unit to a value of 3.1·X(mg) or less, it is possible to manage an error between the quantity of the developer consumption stored in the storage unit and the quantity of the actually consumed developer by suppressing the error within about 10% (Details will be explained later).

Further, when the jam of a transfer material has occurred, a computation unit performs a computation for not changing or decreasing cumulative consumption information for the consumed quantity of image visualizing agent. Accordingly, the cumulative consumption information for the developer consumed due to the jam of the transfer material is not added, which makes it possible to prevent the cost of the consumed developer quantity due to the jam from its being charged to the user.

Further, when the image formation apparatus is under maintenance, the computation unit performs a computation for not changing or decreasing cumulative consumption information for the consumed quantity of image visualizing agent. Accordingly, the cumulative consumption information for the developer consumed by the maintenance of the image formation apparatus is not added, which makes it possible to prevent the cost of the consumed developer quantity due to the maintenance from its being charged to the user.

Further, the charge determination unit determines a charge so that an amount of money for consumed developer becomes any value in a specified unit or more. Accordingly, a user or a service man needs not prepare many changes at the time of adjusting the charge, which makes it possible to reduce a load for charge adjustment.

Further, a display unit displays the cumulative consumption information stored in the storage unit or the charge for the developer calculated based on the cumulative consumption information. The value displayed on the display unit desirably shows the amount of money to be charged for the developer. Accordingly, when charging for the developer, the service man does not need to calculate an amount of money to be charged for the developer, and the user also easily checks the amount of money charged for the developer.

Further, the storage unit is formed with nonvolatile memory. Therefore, the information stored in the storage unit is not possibly destroyed due to a power failure or some other failures, which makes it possible to rigidly manage the charge for the developer.

According to another aspect of this invention, the image formation apparatus is provided. This apparatus can manage consumption information for image visualizing agent by the consumption information management apparatus according to the invention.

Further, the whole or a part of an image formation unit in this image formation apparatus is removable from the main body of the image formation apparatus as a separate unit with respect to the consumption information management apparatus. Accordingly, when the image formation unit is at fault, only the faulty image formation unit can speedily be replaced.

Further, the image formation unit is fixed to the main body of the image formation apparatus by a locking unit. Accordingly, for example, only the service man is allowed to operate this image formation unit, so that the security of the image formation apparatus is enhanced. As a locking system applied to the locking unit, any of the systems as follows may be used: a system of opening a door to operate the image formation apparatus using a key, a system of authorizing a person to reset using cipher, a system of verifying the rights to reset using finger prints or the like, and a system in which only the person allowed to operate the resetting unit can unlock the locking.

According to still another aspect of this invention, the service center determines a charge for developer consumed in an image formation apparatus based on the cumulative consumption information for the image visualizing agent sent from the image formation apparatus, and issues a bill, where the cost for this consumed developer is entered, to the user. Accordingly, the processing for adjustment of the charge for the developer is speedily performed, which makes it easy to manage billing for the image visualizing agent used in the image formation apparatus and collecting the amount of money.

Further, the image formation apparatus transmits again cumulative consumption information by a re-transmitting function of a cumulative consumption information transmitting unit when not receiving acknowledgement information after a predetermined period of time elapses since the cumulative consumption information is transmitted. Accordingly, the service center can surely receive the cumulative consumption information.

Further, on the service center, a charging unit does not charge for received cumulative consumption information when the same information has already been received. Accordingly, double charging can be prevented.

Further, the service center determines a charge for maintenance of an image formation apparatus based on the cumulative consumption information sent from the image formation apparatus, and issues a bill, where the determined amount of money for the maintenance is entered, to the user. Accordingly, it is possible to prevent a bill where the cost for the developer during the maintenance while the user does not use the apparatus is entered, from being issued to the user.

Further, an ordering unit automatically orders the developer as necessary. Accordingly, for example, new developer can be ordered before the image formation apparatus runs out of the developer, which makes it possible to eliminate inconvenience, due to shortage of the developer for the image formation apparatus, brought to the user.

In this consumption information management system, the cumulative consumption information stored in the storage unit is transmitted by the transmitting unit of the consumption information management apparatus to the reception unit of the service center that issues the bill through a network. The amount of money such as the charge for developer or the charge for maintenance is entered in a bill based on the cumulative consumption information received by the reception unit, and this bill is issued to the user of the image formation apparatus. Accordingly, the processing for adjustment of the charge for developer or the charge for maintenance can speedily be performed.

Other objects and features of this invention will become apparent from the following description with reference to the accompanying drawings.

DETAILED DESCRIPTION OF THE PREFERRED EMBODIMENTS

Preferred embodiments of the consumption information management apparatus, image formation apparatus, and the consumption information management system according to this invention will be explained in detail below in order of First embodiment and Second embodiment. A copying machine will be taken up as an example of the image formation apparatus in the following explanation. In this specification, the "image visualizing agent" refers to media to form an image through development, which includes not only a medium to directly form a visible image but also media contributing to the formed image by such a medium. For example, this image visualizing agent includes the toner, carrier, liquid developer, solvent to dilute the liquid developer, ink, ink absorbing agent, and the ink reacting agent, or the like. Further, in this specification, the term "developer" is used for both cases: a case of only toner and a case of toner and carrier.

A first embodiment will be explained in detail below with reference to FIG. 1 to FIG. 17 in order of [Architecture example of the consumption information management system], [Service center], [Image formation apparatus], [Consumption information management apparatus], [Management of charges for toner], [Display unit for cumulative toner consumed quantity], [Stopping of use of the image formation apparatus], [Another examples of the consumption information management apparatus], and [Another examples of the image formation apparatus].

[Architecture Example of the Consumption Information Management System]

Figure 1:
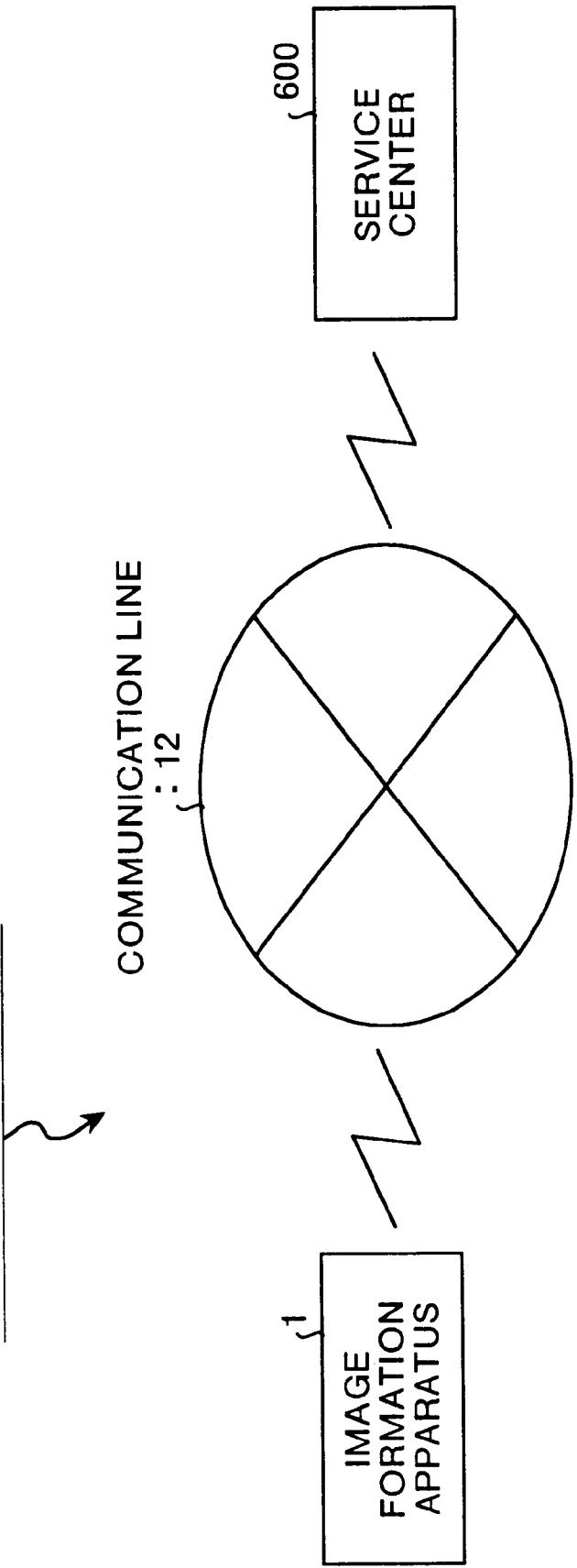
FIG. 1 shows an architecture example of a consumption information management apparatus according to a first embodiment of this invention.

FIG. 1 shows an architecture example of the consumption information management apparatus. In this figure, the legend 1 represents an image formation apparatus formed with a copying machine, or the like, 600 represents a service center that performs remote diagnosis on how the image formation apparatus 1 operates through a communication line 12, and 12 represents the communication line including a telephone line. The image formation apparatus 1 and the service center 600 are connected to each other through the communication line 12, through which data transmission and reception can be performed. Only one unit of image formation apparatus 1 is shown in FIG. 1, but a large number of image formation apparatuses are connected in the actual case.

[Service Center]

Figure 2:
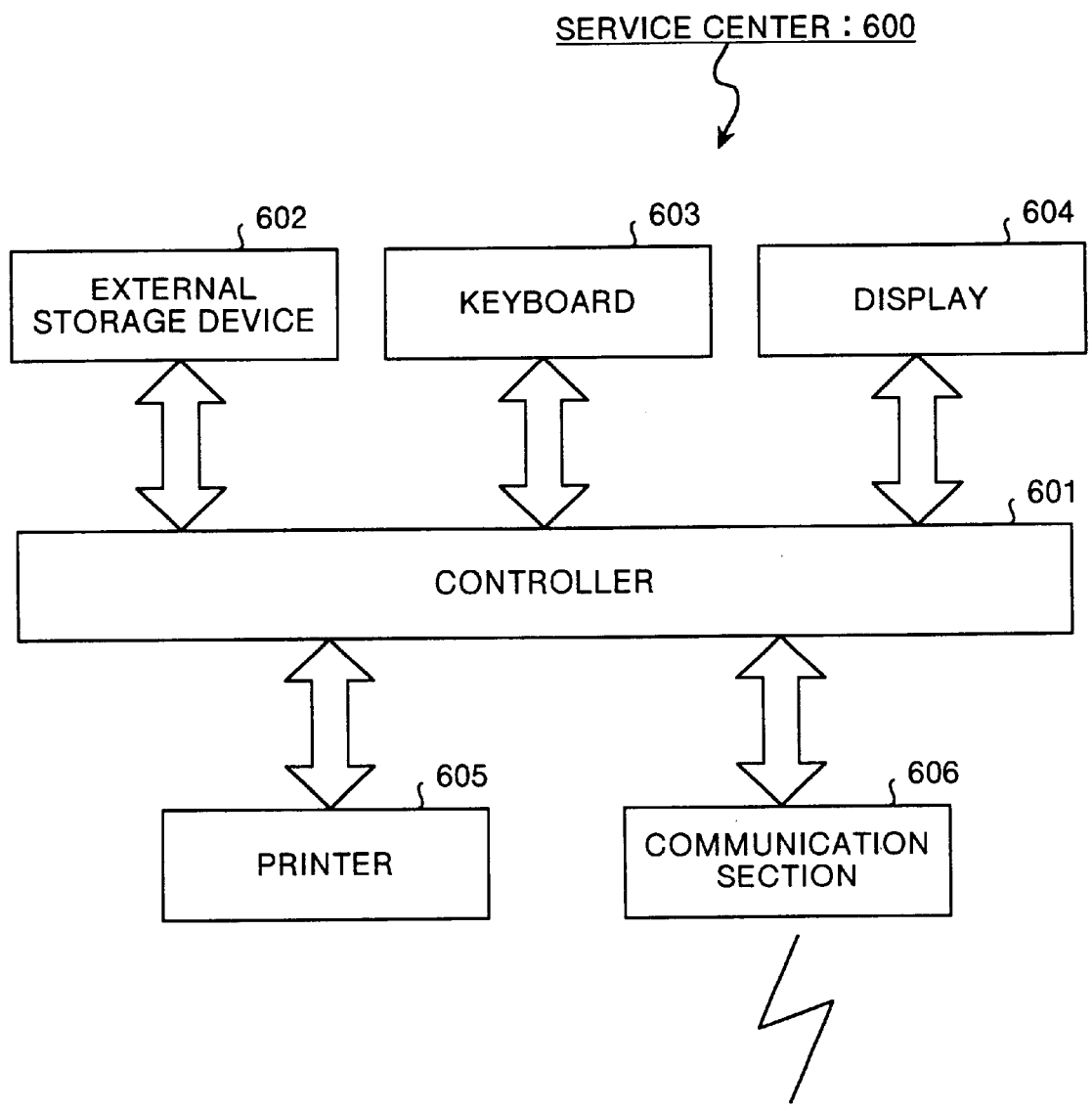
FIG. 2 is a block diagram showing a schematic structure of the service center in FIG. 1.

FIG. 2 is a block diagram showing a schematic structure of the service center 600 in FIG. 1. The service center 600 performs remote diagnosis on how the image formation apparatus 1 operates through the communication line 12. As shown in FIG. 2, the service center 600 comprises the controller 601 that executes various processing, external storage device 602 such as a magnetic disk for storing management data, keyboard 603 as an operation input unit, display 604, printer 605 for data recording, and the communication section 606 connected to the communication line 12 to perform data communications.

[Image Formation Apparatus]

Figure 3:
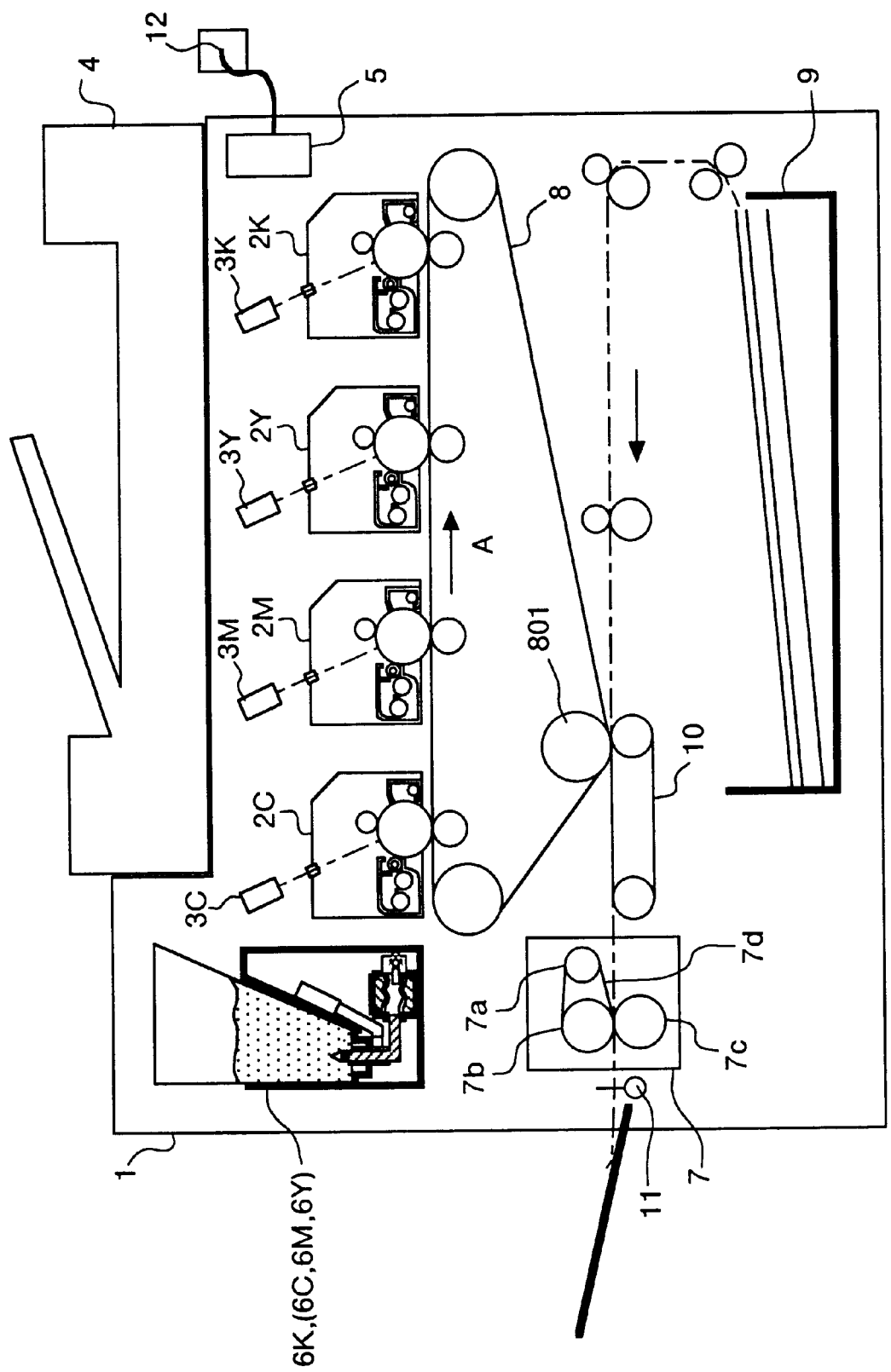
FIG. 3 shows a schematic structure of the overall image formation apparatus in FIG. 1.

FIG. 3 shows an example of a schematic structure of the overall image formation apparatus 1 in FIG. 1. The image formation apparatus shown in this figure is a color image formation apparatus. The overall operation of this image formation apparatus 1 is controlled by the controller 5. This controller 5 comprises a CPU for performing various processing and a memory for storing images. This image formation apparatus 1 has four LED arrays 3C, 3M, 3Y, and 3K. These LED arrays have the same structure as one another to write latent images corresponding to toner images of C (cyan) color, M (magenta) color, Y (yellow) color, and K (black) color on a photoreceptor as an image carrier.

Further, this image formation apparatus 1 has four engine units 2C, 2M, 2Y, and 2K having the same structure as one another. These engine units are used to form respective toner images of the C (cyan) color, M (magenta) color, Y (yellow) color, and the K (black) color on an intermediate transfer belt 8 in response to reception of writing light emitted from the LED arrays 3C, 3M, 3Y, and 3K. Four toner feeders 6C, 6M, 6Y, and 6K as toner supplying units, which have the same structure as one another, feed respective toners corresponding to the toner images of the respective colors to the engine units 2C, 2M, 2Y, and 2K. The toner feeders 6C, 6M, 6Y, and 6K are arranged so as to be along the lateral direction of the intermediate transfer belt 8 that rotates in the direction indicated by the arrow A in FIG. 3.

The outline of the image forming operation of the image formation apparatus 1 will be explained below. In FIG. 3, the digital image data obtained by the scanner 4 or through a network line, not shown, is subjected to image processing such as gradation processing by the controller 5, and sent to the LED arrays 3C, 3M, 3Y, and 3K as writing signals. Each of the LED arrays 3C, 3M, 3Y, and 3K irradiates a writing light corresponding to the writing signal onto the photoreceptor within each of the engine units 2C, 2M, 2Y, and 2K. The engine units 2C, 2M, 2Y, and 2K form toner images of respective colors corresponding to the writing lights on the respective photoreceptors, and successively transfer the toner images of the respective colors onto the intermediate transfer belt 8. During this operation, the controller 5 adjusts writing timings of the LED arrays 3C, 3M, 3Y, and 3K so as to form a full-color image by superposing the toner images of the respective colors on one another on the intermediate transfer belt 8.

The toner image composed of the full-color image formed on the intermediate transfer belt 8 moves in the direction indicated by the arrow A through rotation of the intermediate transfer belt 8. Meantime, a transfer material as a recording medium such as a transfer paper and an OHP sheet is fed from a paper feeder tray 9 toward a nip part formed with the transfer roller 801 as one of stretching and supporting rollers, which stretch and support the intermediate transfer belt 8 so as to rotate, and a conveyor belt disposed opposite to the transfer roller 801 through the intermediate transfer belt 8. At this time, the transfer material is fed at timing so that the front edge of an area where an image is to be transferred on the transfer material and the front edge of the toner image transferred on the intermediate transfer belt 8 will coincide with each other. When the transfer material is passing through the nip part, the toner image transferred on the intermediate transfer belt 8 is collectively transferred on the transfer material. The transfer material with the toner image having been collectively transferred in such a manner is fixed by being pressurized with a pair of pressurizing rollers 7*b* and 7*c* while the toner image is brought into contact with a fixing belt 7*d* heated by a heating roller 7*a* of a fixing device 7 and melted. The transfer material is then ejected outside the apparatus.

When the transfer material is fixed with the toner image by the fixing device 7 and is ejected outside the apparatus, a jam detection unit 11 detects whether the transfer material has been ejected. This jam detection unit 11 comprises a pin disposed so as to cross a conveying path of the transfer material, a pin supporting body for supporting this pin that can freely be fallen and restored, and a detection element that outputs a detection signal in response to detection of the pin fallen. The pin of this jam detection unit 11 is fallen to the downstream side in the conveying direction of the transfer material by the front edge of the transfer material having passed through the fixing unit 7. The pin is restored to the initial state when the rear edge of the transfer material has completely passed through the pin. The jam detection unit 11 sends the specified detection signal to the controller 5 each time the pin is fallen.

The controller 5 determines whether the transfer material has jammed according to whether the detection signal is output from the jam detection unit 11 at predetermined timing at which the pin is supposed to be fallen from the series of image forming process. That is, when the pin is not fallen at the timing, it is determined that a jam of the transfer material has occurred. When it is determined that the transfer material has jammed, the controller 5 stops the image forming operation of the image formation units and issues an alarm to the effect that the transfer material has jammed, for example, the alarm indicating the transfer-material jam is displayed on a liquid crystal panel 101 of a control panel 100, which is explained later. The controller 5 also controls a cumulative consumption information calculating unit 503*c*, which is explained later.

Figure 4:
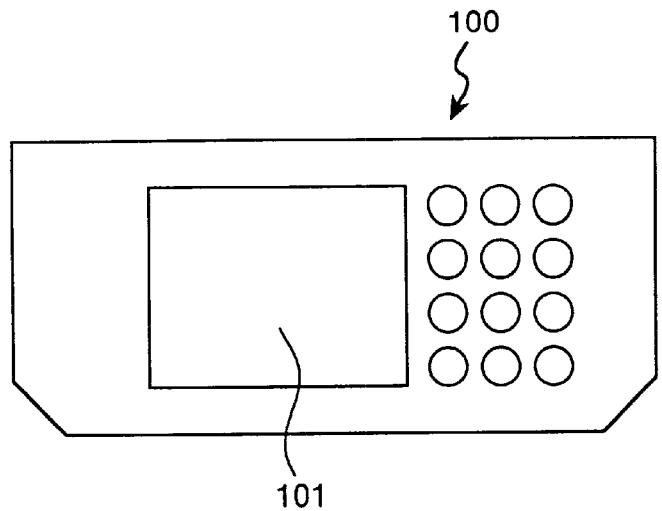
FIG. 4 is a schematic plan view of a control section of the image formation apparatus in FIG. 3.

In the image formation apparatus 1 of this embodiment, its controller 5 is connected to the telephone line (communication line) 12, and the service center 600 can perform remote diagnosis of the operating state of the image formation apparatus 1 through this telephone line (communication line) 12. Further, the image formation apparatus 1 of this embodiment has the control panel 100 including the liquid crystal panel 101 as shown in FIG. 4. By inputting specified code through the control panel 100, the apparatus can enter serviceman mode. This serviceman mode refers to mode used by a service man to perform maintenance of the image formation apparatus.

An example of each structure of the engine units 2C, 2M, 2Y, and 2K will be explained below. Each of these engine units 2C, 2M, 2Y, and 2K is obtained by integrating a plurality of image formation units having the same structure into one unit, which is removable from the main body of the image formation apparatus. The "removable" mentioned here refers to a "removable" state in which the unit can be detached without using any tool, or a state such that each of the engine units 2C, 2M, 2Y, and 2K is fixed to the main body of the image formation apparatus by fixtures and its detachable state is effected by carrying out a predetermined process. In short, the consumption information management apparatus 503 (See FIG. 6) explained later and the engine units 2C, 2M, 2Y, and 2K are provided independently, and only the engine units 2C, 2M, 2Y, and 2K may be removable while the consumption information management apparatus 503 is left in the main body of the image formation apparatus as it is.

Figure 5:
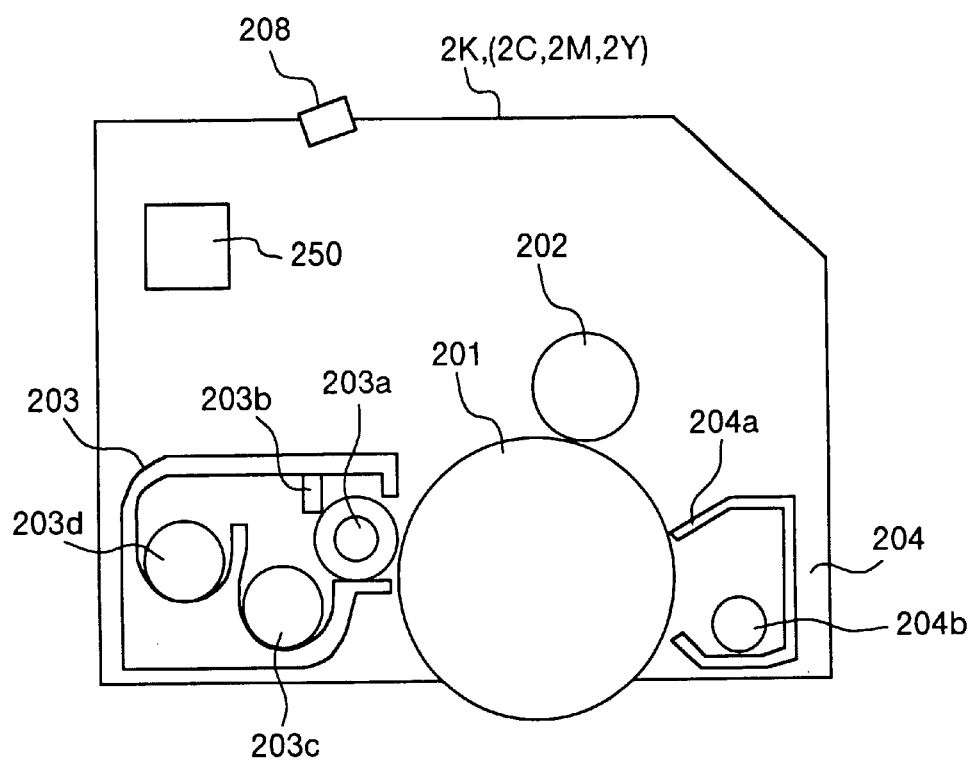
FIG. 5 shows a schematic structure of an engine unit installed in the image formation apparatus in FIG. 3.

For example, as shown in FIG. 5, each of the engine units 2C, 2M, 2Y, and 2K has image formation units as follows arranged within a plastic casing as a unit. The image formation units refer to the photoreceptor 201 as an image carrier, charger 202, disposed along the photoreceptor 201, formed with a charging roller as a charging unit that charges the surface of the photoreceptor 201, developing device 203 as a developing unit that deposits the charged toner on a latent image on the photoreceptor 201 to form an toner image on this photoreceptor 201, and the cleaner 204 as a cleaning unit that removes the toner remaining on the photoreceptor 201 after the toner image is transferred to the intermediate transfer belt 8. The casing has an opening 208 through which a writing light is introduced from each of the LED arrays 3C, 3M, 3Y, and 3K.

Each of the engine units 2C, 2M, 2Y, and 2K has a built-in memory 250 that stores a total quantity of toner consumed by a relevant engine unit (See FIG. 5).

It is desirable that the engine units 2C, 2M, 2Y, and 2K are designed so that the units can be used longer than the main body of the image formation apparatus (indicating a part where the engine units 2C, 2M, 2Y, and 2K are excluded from the image formation apparatus 1, hereinafter the same), or than a rental period or a use period of the image formation apparatus. Accordingly, it is possible to provide an image formation apparatus that does not need to replace the engine units 2C, 2M, 2Y, and 2K with new ones even once during the rental period of the image formation apparatus. As a result, it is possible to reduce the number of times required for maintenance in order to replace each of the image formation units with a new one of the image formation apparatus, and also reduce the running cost. Thus, significant merits are brought to both of the user and the service man.

A case in which a service man visits a user to make a charge for used supplies such as developer and transfer materials for the image formation apparatus will be explained below. In the following explanation, "consumption information" refers to information with which a charge for image visualizing agent consumed through image formation can be calculated, such as a consumed quantity and a cost of image visualizing agent accommodated in the developing device of the color image formation apparatus.

[Consumption Information Management Apparatus]

Figure 6:
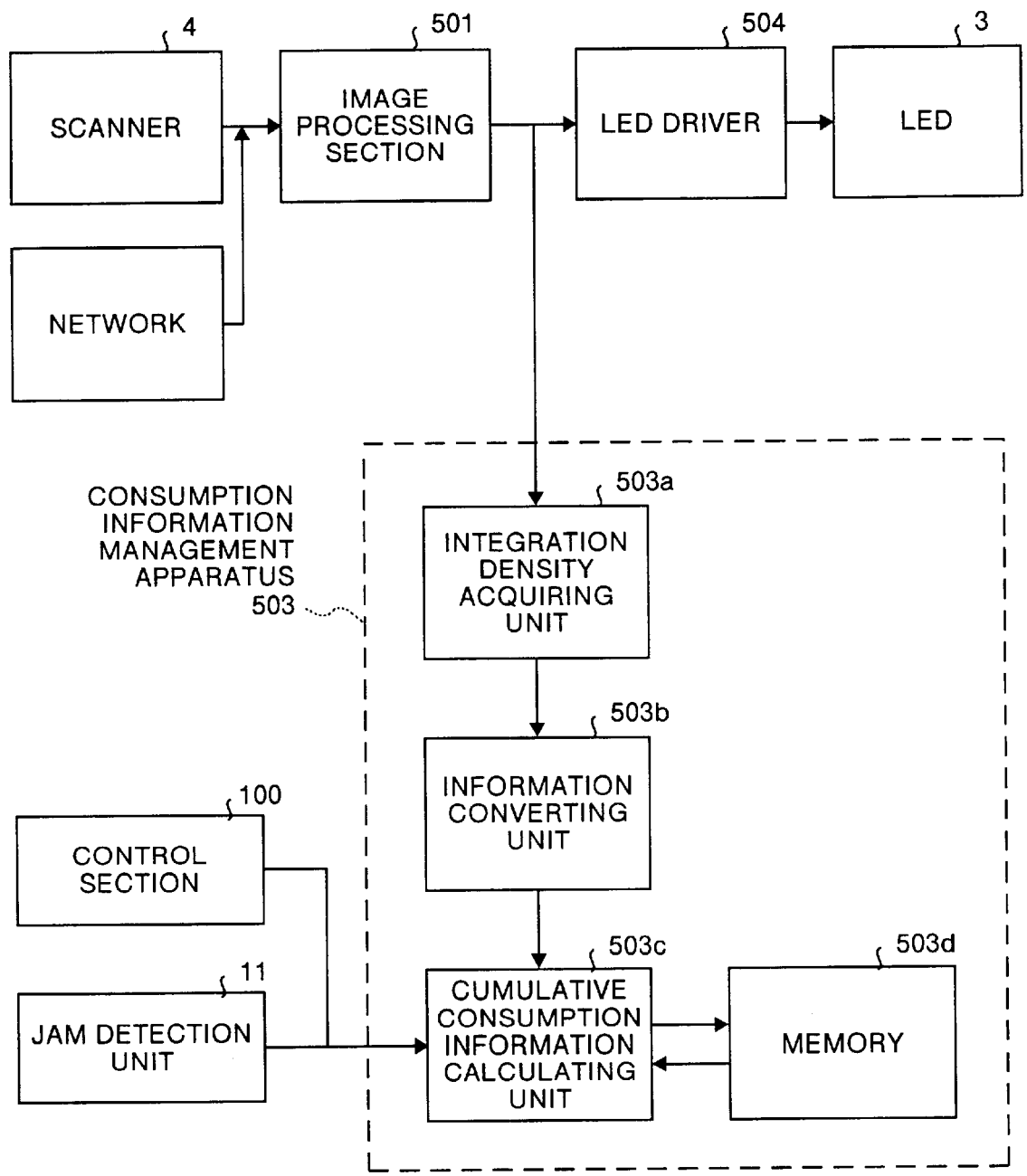
FIG. 6 is a block diagram showing a configuration of a consumption information management apparatus for the image formation apparatus in FIG. 3.
Figure 7:
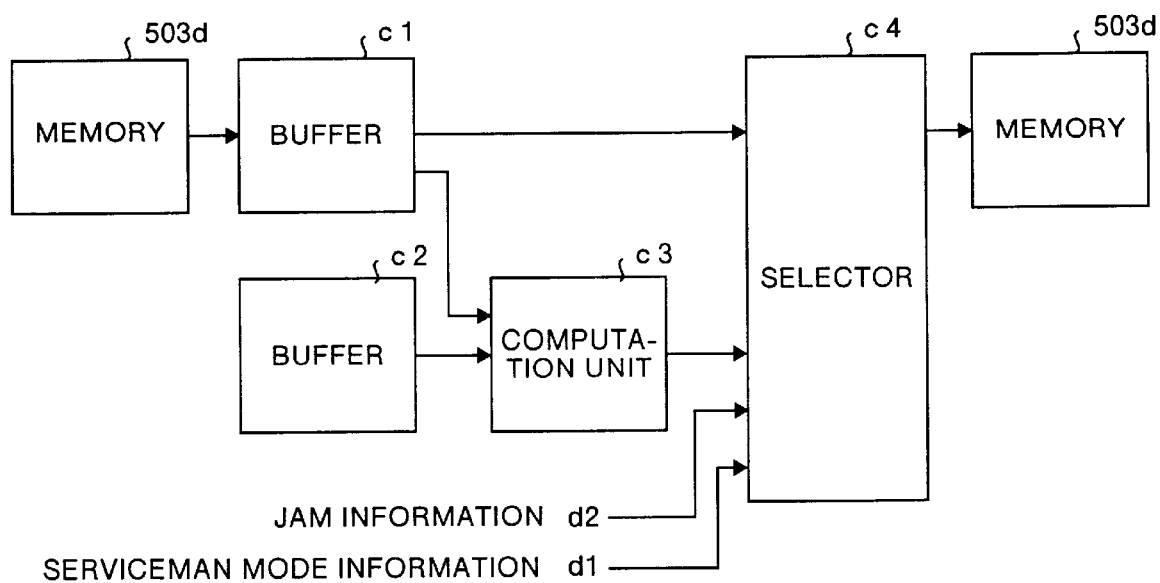
FIG. 7 is a block diagram showing a configuration of a cumulative consumption information calculating unit for the consumption information management apparatus in FIG. 6.
Figure 8:
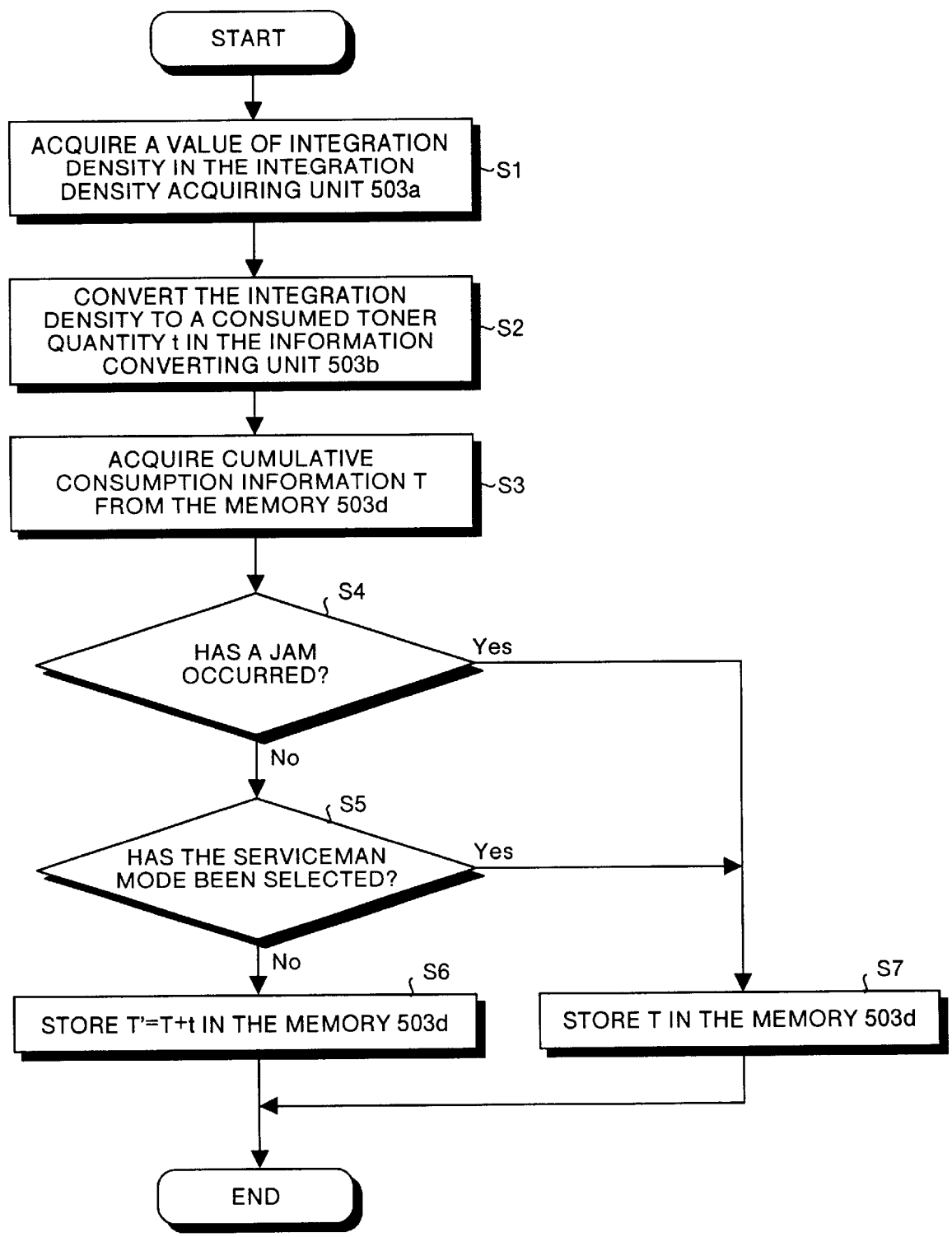
FIG. 8 is a flow chart showing operation of the cumulative consumption information calculating unit for the consumption information management apparatus in FIG. 7.

FIG. 6 is a functional block diagram showing the configuration of the consumption information management apparatus for the image formation apparatus 1 in FIG. 3. FIG. 7 is a block diagram showing the configuration of the cumulative consumption information calculating unit for the consumption information management apparatus in FIG. 6. FIG. 8 is a flow chart showing the processing of calculating consumption information in the consumption information management apparatus of FIG. 6.

The consumption information management apparatus 503 is an apparatus that manages consumption information for supplies such as toner as the developer, and is disposed as a part of the controller 5, corresponding to each toner of respective colors.

This consumption information management apparatus 503 acquires consumption information based on the information for density of digital image signals and calculates a quantity of toner consumption. As shown in FIG. 6, the consumption information management apparatus 503 comprises the integration density acquiring unit 503*a*, information converting unit 503*b*, cumulative consumption information calculating unit 503c, and the memory 503d. Jam information for a transfer material is sent from the jam detection unit 11 to the cumulative consumption information calculating unit 503c. The consumption information management apparatuses 503 corresponding to toners of respective colors have the same structure as one another, therefore, only a consumption information management apparatus corresponding to toner of one color will be explained below.

The operation of the consumption information management apparatus 503 will be explained below. In FIG. 6, the image information sent from the scanner 4 or through a network such as the Internet or an internal LAN is transmitted to the image processing section 501 of the image formation apparatus 1. This image processing section 501 subjects the image information obtained from the scanner 4 to processing such that RGB signals are converted to CMYK signals and the converted signals are filtered. The image processing section 501 subjects the image information obtained through the network to processing such that the information described in a page-description language is bit-mapped.

The image processing section 501 finally outputs bitmap information and transfers it to the LED driver 504. The LED driver 504 converts the bitmap information to writing signals to deliver them to the LED. This bitmap information is sent to the consumption information management apparatus 503 concurrently when it is sent to the LED driver 504.

In the consumption information management apparatus 503, the integration density acquiring unit 503a acquires integration density from the image signals. The "integration density" mentioned here refers to a total sum of image density used for forming one sheet of image. More specifically, in this embodiment, binary write is performed as a recording system to determine a total number of dots for image formation as integration density. In a case of a multi-value image, a value of total density as a total sum of density values of pixels is multiplied by 1/p when the number of levels of gray scale per pixel is p, and from then on, the calculation explained below can be applied as it is.

The information converting unit 503b receives the integration density from the integration density acquiring unit 503a, and multiplies this density by a specified coefficient to determine the value as a quantity of toner consumption (consumption information). This specified coefficient is different according to each device and toner. Assuming that density is ideally proportional to a quantity of toner consumption, when the quantity of toner consumed at the time of outputting an image with toner over the surface of recording paper (transfer material) is 0.7 (mg/cm$^2$), it can be linearly calculated in the recording system of 600 (dpi) that toner of 0.000012545 (mg) is consumed per pixel. Accordingly, it can easily be calculated that the toner consumed for outputting an image consisting of n pixels is 0.000012545×n (mg). However, it is not always said in an actual case that the number of pixels is proportional to the quantity of toner consumption. Therefore, it may be required to prepare a table corresponding to density for each image forming device and perform necessary correction. The consumption information management apparatus of this embodiment calculates a quantity of toner to be consumed assuming that the number of pixels is proportional to the quantity of toner consumption, in the interests of simplicity.

The quantity of toner to be consumed calculated by the information converting unit 503b is sent to the cumulative consumption information calculating unit 503c. This cumulative consumption information calculating unit 503c has a memory 503d for temporarily storing information for a quantity of toner consumption, and reads out cumulative consumption information from the memory 503d at predetermined timing. This timing may be used to read out the information from the memory 503d each time a sheet of image is output, or to calculate a quantity of cumulative toner consumption, after one job is finished and a plurality of images are output, from a total number of pixels that the plurality of output images obtain.

The cumulative consumption information mentioned here refers to information obtained by summing the quantities of toner consumption from a specified point in time in the past. The cumulative consumption information calculating unit 503c fetches the cumulative consumption information from the memory 503d, and calculates new cumulative consumption information while checking serviceman mode information dl sent from the control panel 100 to the controller 5 and jam information d2 sent from the jam detection unit 11 (See FIG. 7). The serviceman mode information dl mentioned here refers to information showing "0" when the image formation apparatus 1 is used in the serviceman mode in which the service man performs its maintenance, and showing "1" in the other cases. The jam information d2 mentioned here refers to information showing "0" when it is determined that a transfer material has jammed, and showing "1" in the other cases.

As shown in FIG. 7, the cumulative consumption information calculating unit 503c in this embodiment comprises the buffer c1 as a storage unit that fetches the cumulative quantity of toner consumption T from the memory 503d and temporarily stores the value, and the buffer c2 as a storage unit that temporarily stores the quantity of toner t consumed through image forming operation. This cumulative consumption information calculating unit 503c also comprises the computation unit c3 that sums the toner quantity t and the quantity of cumulative toner consumption T to obtain new cumulative consumption information T'=T+t, and the selector c4 that selects T when either one or both of the serviceman mode information and the jam information are "0", and selects T' in the other case. The value selected by the selector c4 is then stored in the memory 503d as new cumulative consumption information.

Accordingly, when test output is performed during maintenance by a service man or when a transfer material has jammed, the cumulative consumption information is not added, so that charging for output, which is undesirable for the user, is prevented. This embodiment uses a nonvolatile memory such as a magnetic memory, as the memory 503d, that can save stored contents even when the power is turned off. This is because the memory 503d of this embodiment is used to store a cumulative total for consumed toner quantities for a specified period and inaccurate charging due to disappearance of the memory contents when the power is turned off should be prevented.

The above-mentioned operation will be explained below with reference to the flow chart of FIG. 8. In FIG. 8, the integration density acquiring unit 503a acquires a value of integration density (step S1). The information converting unit 503b converts the integration density to consumed toner quantity t (step S2). The cumulative consumption information T is read out from the memory 503d (step S3).

At step S4, it is determined whether the transfer material has jammed or not during image forming operation. When it is determined that the transfer material has jammed (step S4, "Y"), the cumulative consumption information T is not updated but is stored in the memory 503d as it is (step S7), and the processing is ended. At step S4, when the jam has not occurred (step S4, "Y"), it is determined this time whether the serviceman mode has been selected (step S5).

At step S5, when it is determined that the serviceman mode has been selected (step S5, "Y"), the cumulative consumption information T is not updated but is stored in the memory 503d as it is (step S7), and the processing is ended. At step S5, when the serviceman mode has not been selected (step S5, "N"), T'=T+t is stored in the memory 503d as new cumulative consumption information (step S6), and the processing is ended.

In this embodiment, a computation is performed by simple summing. However, any computation supporting further detailed services may be used. For example, when a predetermined quantity or more of toner is consumed cumulatively, a computation, that a toner quantity t consumed through image forming operation is multiplied by a specified coefficient α not more than "1" and the value is added to the quantity of cumulative toner consumption T, T'=T+α×t is performed. By performing such a computation, the user that consumes a large quantity of toner may be well treated.

The method of not charging for toner when the serviceman mode is selected or the transfer material has jammed is not limited to the method according to this embodiment. For example, a unit for storing a cumulative total of consumed toner quantities on an unconditional basis may be provided, and a unit for storing a cumulative total of toner quantities consumed in the serviceman mode or during the jam of the transfer material may also be provided. By doing such, the consumption information management apparatus 503 can easily calculate the amount of money to be charged to the user by subtracting the cumulative total of the toner quantities consumed in the serviceman mode or during the jam of the transfer material from the cumulative total of consumed toner quantities.

As explained above, the consumption information management apparatus 503 calculates consumption information based on the information for the density of digital image signals. Thus, it is possible to calculate the quantity of toner consumption easily and accurately.

Further, when the jam of the transfer material has occurred or when the serviceman mode has been selected, a computation is so performed that the cumulative consumption information for the consumed quantity of the developer is not changed or is decreased. Therefore, the cumulative consumption information for the developer consumed due to the jam of the transfer material is not added. Thus, it is possible to prevent the cost of the developer for the consumed quantity due to the jam from its being charged to the user.

[Management of Charges for Toner]

The cumulative consumption information stored in the memory 503d of this embodiment is a cumulative quantity of toner consumed since the last payment for toner. This cumulative quantity of toner consumption can be reset through operation of a resetting unit, not shown, at the point in time when the service man has checked an amount for toner and made a charge for it. In this case, it is desirable that the resetting unit is locked so that only the service man can operate this unit in order to enhance the security. As a method of locking the resetting unit, any method may be used if only a person allowed to operate the resetting unit can unlock the locking, such as a method of opening a door to operate the consumption information management apparatus 503 using a key, a method of giving a person a resetting right by means of cipher, or a method of confirming a resetting right by means of finger prints or the like.

The information to be stored in the memory 503d is a quantity of toner consumption itself in this embodiment, for example, information such that the consumed toner is 100 (g). However, the information is not limited to such a method, but a numeric value corresponding to the quantity of toner consumption may be stored. For example, by storing a numeric value such that 1 is incremented with respect to a toner consumption of 100 (g), it is understood that the numeric value having been incremented by n indicates that the toner of 100×n (g) has been consumed.

However, like in this embodiment, when consumption information is acquired and stored each time one image forming operation is performed, the memory 503d within the consumption information management apparatus 503 desirably stores a quantity of toner consumption substantially in a small units of 2 (mg), possibly 0.2 (mg), and more desirably 0.02 (mg) or less in order to adequately grasp the quantity of toner consumption.

For example, a quantity of toner consumed for outputting an A4-size image with toner over the surface of the transfer material is about 0.7 (mg/cm$^2$) depending on conditions of image forming devices. Calculation is performed based on this value. By outputting one sheet of A4-size image with toner over the surface of the transfer material, the toner of about 430 (mg) is consumed. However, the ratio of an area where toner is deposited with respect to the whole transfer material (the toner-image occupancy ratio) is often 5% or less in an actual monochrome image. The quantity of toner consumed when this image occupancy ratio is 5% or less becomes 21.6 (mg) or less. Therefore, if such an image with the toner-image occupancy ratio of 5% or less is to be stored in units of 100 (mg) in the memory 503d within the consumption information management apparatus 503, the quantity of toner consumption for this image cannot be stored in the memory 503d.

Therefore, as explained above, when a toner quantity consumed for outputting an image with toner over the surface of the transfer material is 0.7 (mg/cm$^2$), in order to store the quantity of toner consumption for an image where a toner-image occupancy ratio is 5% or less, a quantity of toner consumption needs to be managed based on at least about 20 (mg) as a unit of storage for the memory 503d. When quantities of toner consumption are managed in units of 2.16 (mg), an error between the quantity of toner consumption stored in the memory 503d and the quantity of toner actually consumed is about 10%. When quantities of toner consumption are managed in units of 0.216(mg), the error is about 1%, and when quantities of toner consumption are managed in units of 0.0216 (mg), the error is within 0.1%.

That is, when a toner quantity consumed for outputting an image with toner over the surface of the transfer material is X (mg/H), it is preferable that a unit of recording a quantity of toner consumption stored in the memory 503d is 3.1·X (mg) or less in order to manage the error being suppressed to within 10%. This also holds in a case where the number of pixels, not the quantity of toner consumption, is stored in the memory 503d. For example, 55800 pixels are included in 1 cm$^2$ based on 60 dpi. Based on this value, a total number of pixels of the image where the toner-image occupancy ratio is 5% is calculated. The number of pixels to be stored in the memory 503d is 1.73 million pixels. Based on 55800 pixels×3.1=173 thousand pixels as a unit of storage for the memory 503d, an error is about 10%.

[Display Unit for the Quantity of Cumulative Toner Consumption]

It is further preferable in this embodiment that a display unit for displaying the consumption information for toner is provided. This display unit displays counter information on its liquid crystal panel 101 through pressing of an operation button on the control panel 100 (See FIG. 4). The display unit may also get electrically access to the memory 503*d* within the consumption information management apparatus 503 and read the consumption information for toner. As the display unit, an analog (mechanical) counter that counts up in sync with a mechanical operation according to conveyance of toner in the image formation apparatus 1 may be used. In this case, the counter performs a function as the memory 503*d*.

In this embodiment, the value displayed on the liquid crystal panel 101 (or the counter) desirably shows an amount of money for toner to be charged itself. That is, as a value to be displayed, a quantity of toner consumption itself may be displayed as consumption information, or a count value obtained by counting up based on a predetermined rule corresponding to the quantity of toner consumption may be displayed. However, if the display unit is provided, by directly displaying an amount of money for toner to be charged, the service man does not need to calculate a charge for toner when it is to be charged, and the user can also easily check the amount for the toner.

Further, it is preferable that a value displayed on the liquid crystal panel 101 (or the counter) is rounded so that an amount for toner to be charged becomes a rounded amount of money such as the amount in units of 10 yen, and displayed. For example, when a consumed toner is 100.1 (mg) and a charge per toner 100 (mg) is 18,000 yen (including a consumption tax), the charge corresponding to the quantity of toner consumption will be 18,018 yen. However, the amount displayed on the liquid crystal panel 101 (or the counter) is rounded so as to be 18010 yen. In this case, 8 yen as a portion, that is not charged, is stored in the memory 503*d* and managed, and is added to the next amount to be charged. Accordingly, the user and the service man are not required to prepare many changes when adjustment of the charge is made, which can reduce a load for adjustment of charges.

In order to perform such a function, the display unit of this embodiment uses a unit for converting toner consumption information read out from the memory to an amount of money to be charged, a unit for excluding an odd sum (an amount of money of 10 yen or less in this embodiment) from the charged amount, and a unit for storing the odd sum in order to be added to an amount to be charged next time. When the odd sum is rounded down so that it is not a target for the charge, there is no need to provide the unit for storing the odd sum.

[Charging for Toner]

At the time of charging for toner, the service man performs predetermined operation on the control panel 100 as a display unit for a quantity of cumulative toner consumption to display the quantity of cumulative toner consumption stored in the memory 503*d*. An amount is displayed in units of 10 yen through this operation in this embodiment. This amount indicates the cost for the toner used by the user from the point in time when a charge for toner is last made until the operation this time.

The service man confirms the amount, and collects the money for the toner from the user or makes a charge for the toner, and then resets the quantity of cumulative toner consumption in the memory 503*d* through the predetermined operation. Accordingly, the quantity of cumulative toner consumption within the memory 503*d* is reset to "0", or rewritten to only the quantity of the toner corresponding to the amount (the amount less than 10 yen) not yet charged. Accumulation of the consumption information is then restarted for the next charging for toner.

The service man gives toner for charging to the user as required. The toner is given to the user with no charge or with a charge only for transportation, that is, the amount for toner is not charged. Accordingly, the user pays only for the toner actually used.

[Stopping of Use of the Image Formation Apparatus]

When the use of the image formation apparatus is stopped on the expiration of a rental period or due to replacement of models, the service man makes a charge for toner based on the quantity of cumulative toner consumption, and takes back the image formation apparatus with him. At this time, the service man does not make a charge for the not-yet-used toner remaining in a toner bottle or the like of the image formation apparatus. Accordingly, the user pays only for the toner actually used, which is economical. Further, as explained in this embodiment, when the transfer material has jammed, the quantity of toner consumption is not added. Therefore, the user does not need to pay for the toner consumed due to some trouble in the image formation apparatus, so that the user has a merit in terms of cost.

As explained above, each of the engine units 2C, 2M, 2Y, and 2K is obtained by integrating the image formation units such as the developing device 203, charger 202, photoreceptor 201, and the cleaner 204 into one unit, and is disposed separately from the consumption information management apparatus 503, so that each of the units can be removed from the main body of the image formation apparatus. Further, when these engine units 2C, 2M, 2Y, and 2K are to be recycled, the total quantity of toner consumed in each of the engine units is stored in the memory 205 of the engine unit, thus easily knowing the remaining life of this engine unit. Therefore, when any of the image formation units is at fault, by replacing only the faulty image formation unit with a new one, the replacement can speedily be performed while the quantity of cumulative toner consumption stored in the memory 250 is kept as it is.

[Another Examples of the Consumption Information Management Apparatus]

Another examples 1 to 4 of the consumption information management apparatus 503 will be explained below with reference to FIG. 9 to FIG. 15.

[Another Example 1 of the Consumption Information Management Apparatus]

Figure 9:
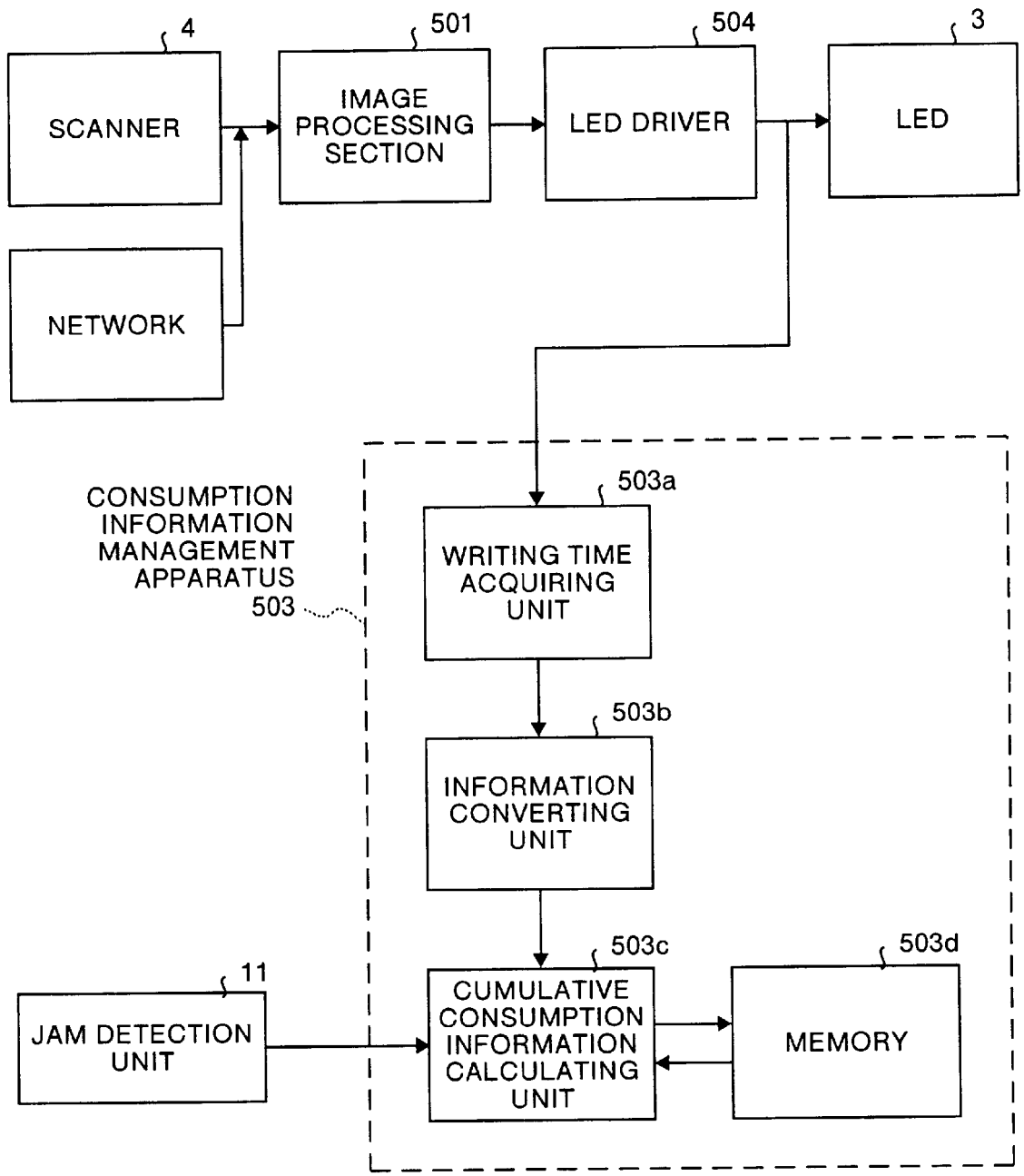
FIG. 9 is a block diagram showing a configuration of a consumption information management apparatus according to another example 1 of the consumption information management apparatus.

Another example 1 of the consumption information management apparatus 503 is shown in FIG. 9. In FIG. 9, the same legends are assigned to those having the same functions as the sections in FIG. 6. In FIG. 9, in the consumption information management apparatus 503, the writing time requiring unit 503*a* integrates writing times of writing signals output from the LED driver 504, and the image creation unit 503*b* calculates a quantity of toner consumption based on the integrated writing time. If the image information is multi-valued and the LED 3 performs pulse modulation, the method of integrating writing times can more easily obtain a quantity of toner consumption than the method of adding multi-value density. The processing of the consumption information management apparatus 503 shown in FIG. 9 is the same as that of FIG. 8 except replacement of "integration density" at step S1 in the flow chart of FIG. 8 with "writing time". The information converting unit 503*b* converts the writing time to a quantity of consumed toner t instead of conversion of the integration density to the quantity of consumed toner t.

[Another Example 2 of the Consumption Information Management Apparatus]

Figure 10:
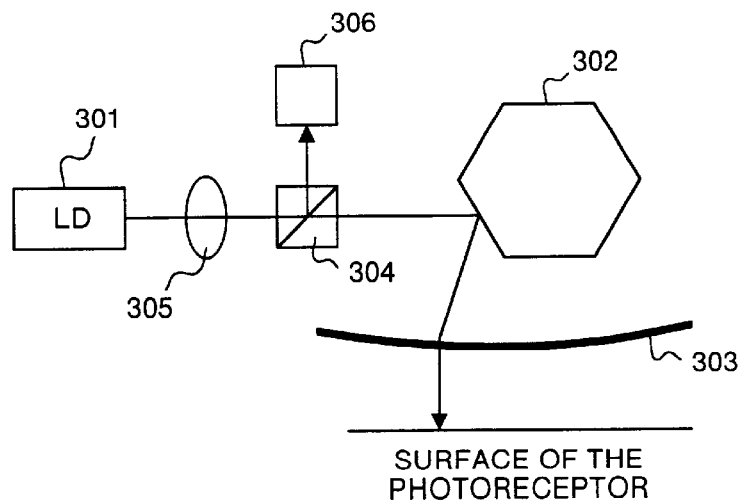
FIG. 10 is a schematic view showing a writing unit according to another example 2 of the consumption information management apparatus.
Figure 11:
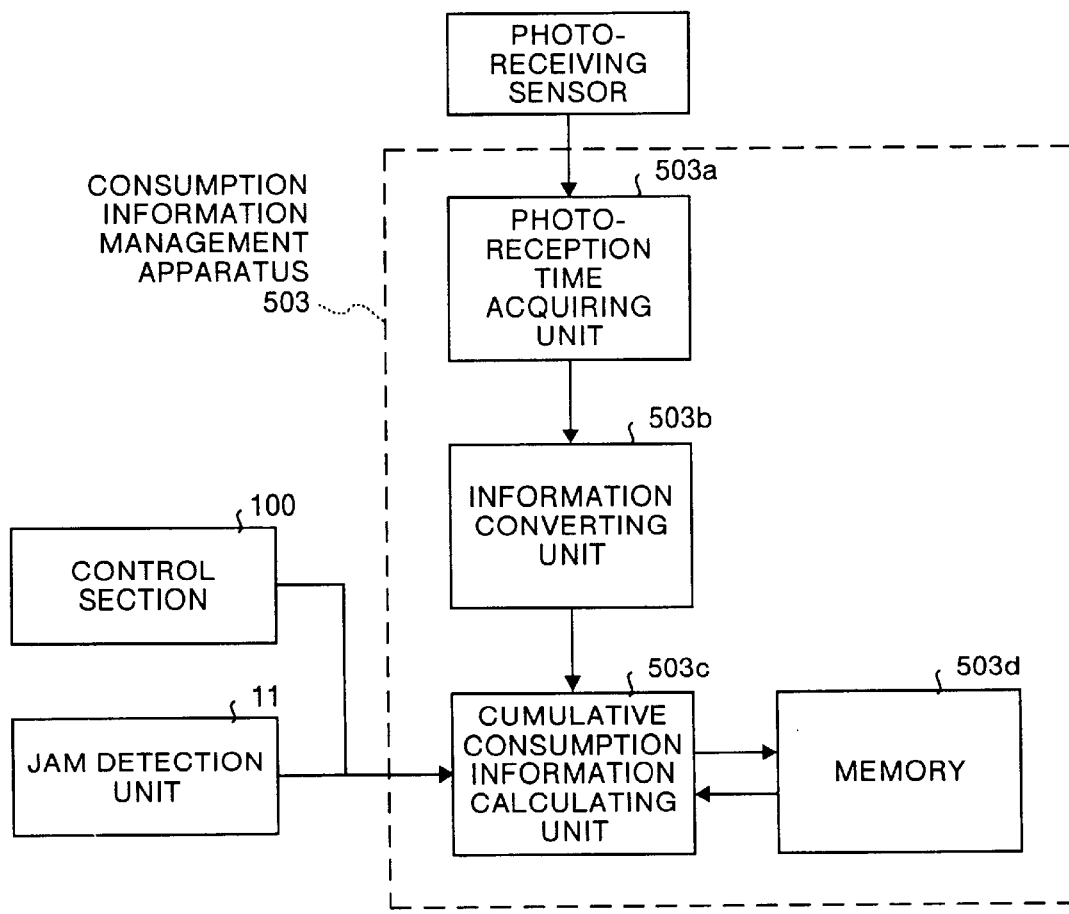
FIG. 11 is a block diagram showing a configuration of a consumption information management apparatus according to another example 2 of the consumption information management apparatus.

Another example 2 of the consumption information management apparatus 503 will be explained below with reference to FIG. 10 and FIG. 11. FIG. 11 shows another example 2 of the consumption information management apparatus 503. In FIG. 11, the same legends are assigned to those having the same functions as the sections in FIG. 6. In this example, the writing unit is an LD 301. In FIG. 10, the light beam output from the LD 301 is reflected by a polygon mirror 302 and reaches the surface of a photoreceptor through an f θ lens 303. There is a polarizer 304 between the LD 301 and the polygon mirror 302, where the light beam from the LD 301 is polarized. The polarized light beam is resolved into two through a known polarized beam splitter 304. One of the resolved beams is sent to the polygon mirror 302 to form a latent image, while the other beam is sent to a photo-receiving sensor 306 that measures an irradiation time of a writing light to obtain consumption information. The photo-receiving sensor 306 sends a photo-reception time to the consumption information management apparatus 503.

In the consumption information management apparatus 503 shown in FIG. 11, the photo-reception time acquiring unit 503a integrates the photo-reception times output from the photo-receiving sensor 306, and the information converting unit 503b calculates a quantity of toner consumption based on the integrated photo-reception time. The processing of the consumption information management apparatus 503 shown in FIG. 11 is the same as that of FIG. 8 except replacement of "integration density" at step S1 in the flow chart of FIG. 8 with "photo-reception time". The information converting unit 503b converts the photo-reception time to a quantity of consumed toner t instead of conversion of the integration density to the quantity of consumed toner t.

[Another Example 3 of the Consumption Information Management Apparatus]

Figure 12:
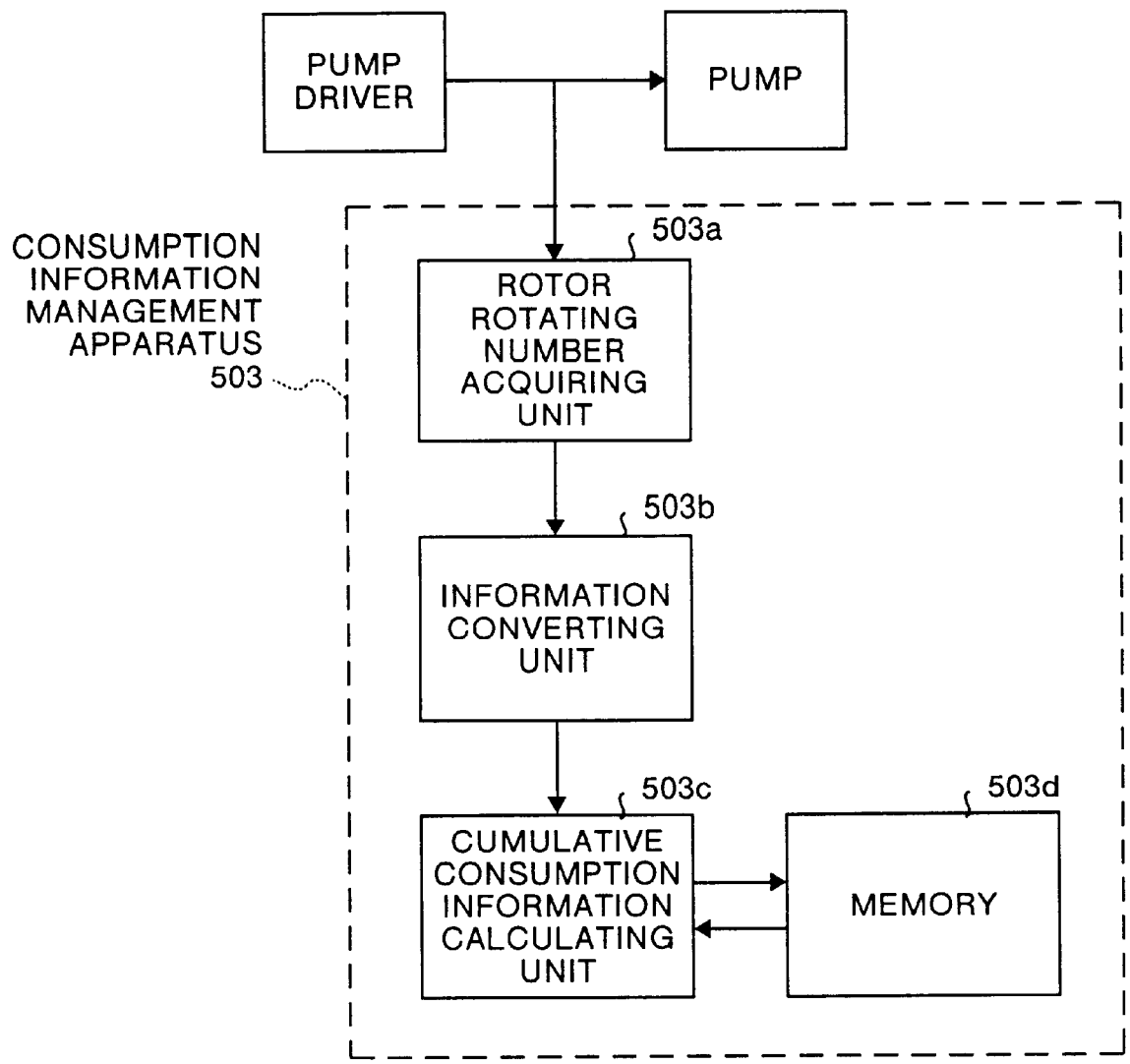
FIG. 12 is a block diagram showing a configuration of a consumption information management apparatus according to another example 3 of the consumption information management apparatus.

Another example 3 of the toner-consumed quantity management apparatus 503 is shown in FIG. 12. In FIG. 12, the same legends are assigned to those having the same functions as the sections in FIG. 6. In the consumption information management apparatus 503 shown in FIG. 12, the toner feeder 6 reads a number of rotation of a rotor in an axially eccentric screw pump, and acquires a quantity of conveyed toner based on the number to calculate a quantity of toner consumption. The toner quantity within the developing device 203 is detected by a detection electrode disposed inside the developing device 203.

That is, this detection electrode is disposed in a state of being electrically insulated from a developing sleeve within the developing device 203. An electrostatic capacitance between the developing sleeve and the detection electrode changes in association with change in the quantity of developer within the developing device 203. Based on this change, it is detected that the developer quantity has been short.

When it is noticed that the toner quantity in the developing device 203 has been short from the detection electrode, the developer is fed from a toner bottle, not shown, into the developing device 203 by the axially eccentric screw pump. This axially eccentric screw pump feeds the toner of the quantity substantially proportional to the number of rotation of the rotor. Therefore, if the number of rotation of the rotor is counted and the counted number is multiplied by a specified coefficient, it is possible to know about a quantity of developer newly fed into the developing device 203. The quantity of the developer fed into the developing device 203 is regarded as the quantity of the consumed developer.

As a method of counting the number of rotation of the rotor, a method of calculating a sum of driving times based on a stepping-motor driving signal from a pump driver may be used, or a method of incrementing a mechanical counter by conveying the rotation to a counter connected to the rotary shaft to rotate the rotor through a gear may be used.

In FIG. 12, the pump driver that drives the axially eccentric screw pump sends a stepping-motor control signal to the stepping motor to drive the axially eccentric screw pump. This stepping-motor control signal is also sent to the consumption information management apparatus 503, where a rotor rotating number acquiring unit 503a acquires the number of rotation of the rotor from the stepping-motor control signal and outputs the number to the information converting unit 503b. The information converting unit 503b calculates a quantity of consumed developer t by multiplying the number of rotation of the rotor by a specified coefficient.

The processing of the consumption information management apparatus 503 shown in FIG. 12 is the same as that of FIG. 8 except replacement of "integration density" at step S1 in the flow chart of FIG. 8 with "rotor rotating number". However, the information converting unit 503b converts the number of rotation of the rotor to a quantity of consumed toner t instead of conversion of the integration density to the quantity of consumed toner t.

[Another Example 4 of the Consumption Information Management Apparatus 503]

Figure 13:
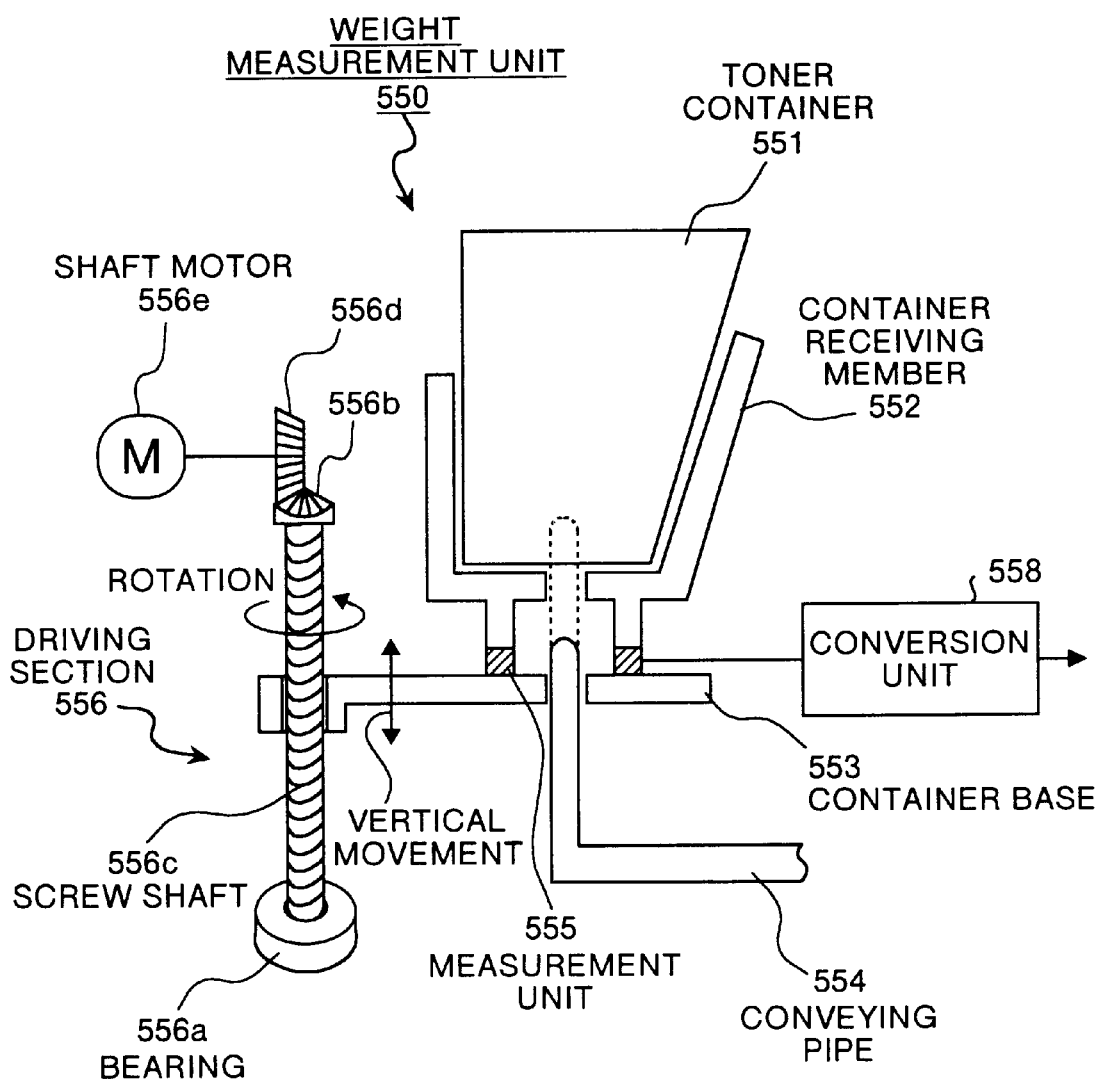
FIG. 13 shows a structural example (schematic cross-sectional view) of a weight measurement unit (measurement equipment) according to another example 4 of the consumption information management apparatus.
Figure 14:
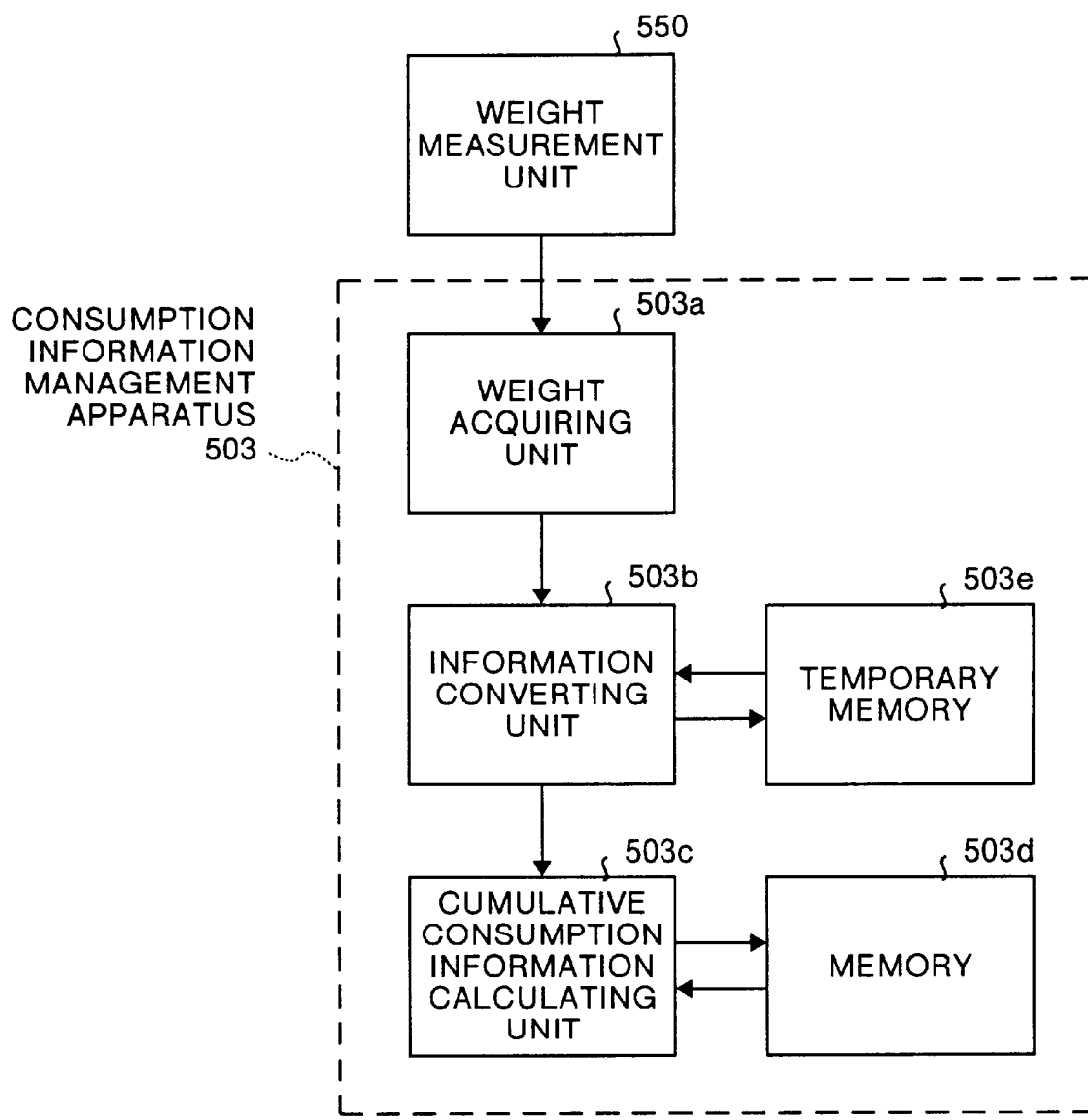
FIG. 14 is a block diagram showing a configuration of a consumption information management apparatus according to another example 4 of the consumption information management apparatus.
Figure 15:
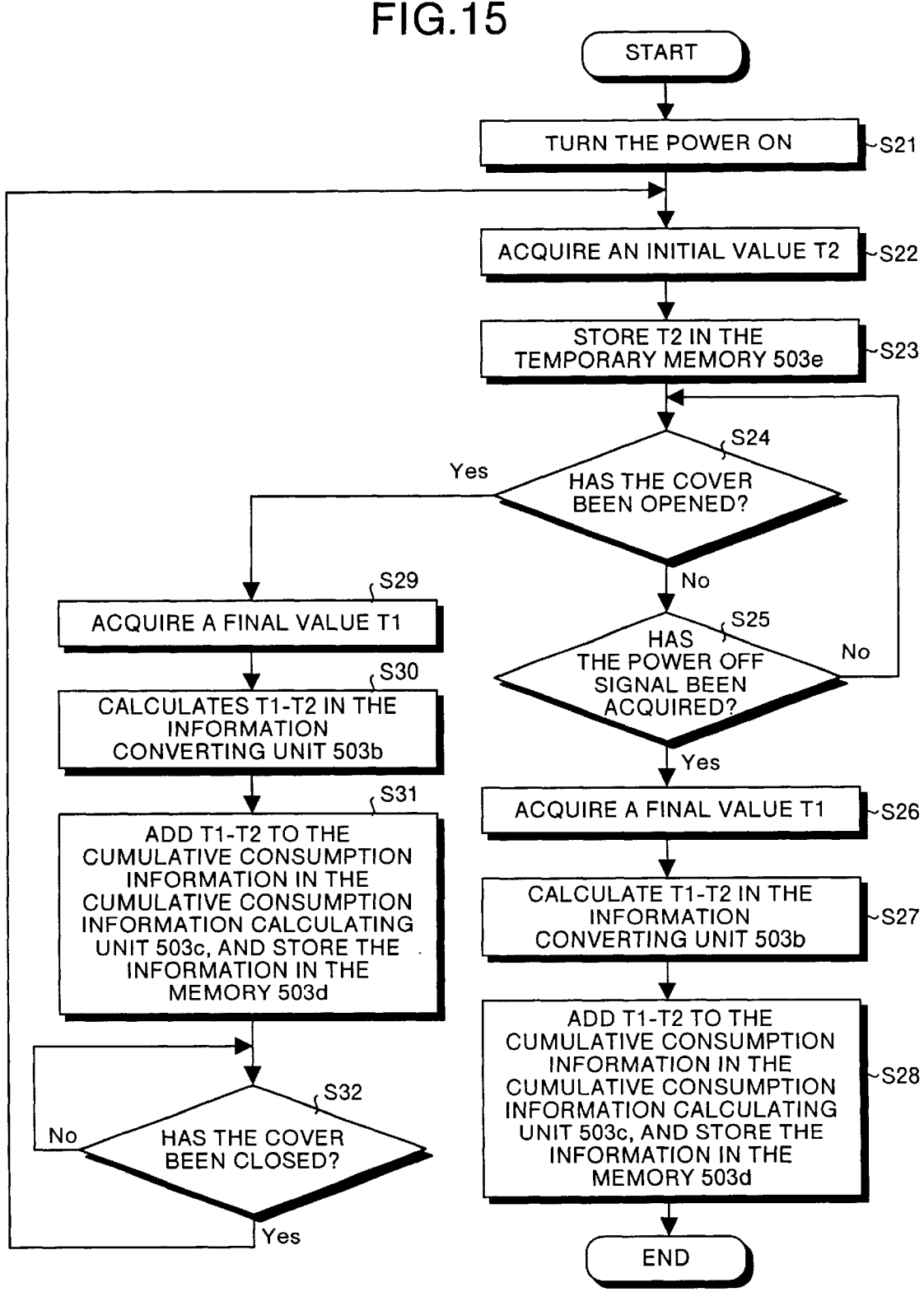
FIG. 15 is a flow chart showing operation of the consumption information management apparatus according to another example 4 of the consumption information management apparatus.

Another example 4 of the consumption information management apparatus 503 will be explained below with reference to FIG. 13 to FIG. 15. FIG. 13 shows a structural example (schematic cross-sectional view) of the weight measurement unit (measurement equipment) 550 for measuring a weight of a toner (image visualizing agent) container disposed within the image formation apparatus of FIG. 1. FIG. 14 shows another example 4 of the consumption information management apparatus 503. FIG. 15 is a flow chart showing the processing for calculating consumption information in the consumption information management apparatus of FIG. 14. In FIG. 14, the same legends are assigned to those having the same functions as the sections in FIG. 8.

The weight measurement unit (measurement equipment) 550 shown in FIG. 13 comprises the container receiving member 552 for placing a toner container 551, container base 553, measurement unit (measuring instrument) 555 formed with a piezoelectric element, conveying pipe 554 that conveys toner from the toner container 551, driving section 556 that moves the container base 553 in the vertical direction, and the conversion unit 558.

The driving section 556 is rotatably supported by a bearing 556a, and comprises the screw shaft 556c with a gear 556b, engaging a gear 556d, formed on the top of the screw, gear 556d engaging the gear 556b of the screw shaft 556c, and the shaft motor 556e that rotates the gear 556d. The shaft motor 556e rotates the gear 556d according to a control signal from the controller 5, and the gear 556b and the screw shaft 556c rotate in sync with rotation of this gear 556d. The container base 553 moves up and down according to a rotating direction of the screw shaft 556c.

The toner container (image visualizing agent container) 551 of the toner feeding section is accommodated in the container receiving member 552, which is placed on the container base 553 movable upwardly and downwardly. The measuring instrument 555, which measures a weight of the toner container 551, is disposed between the container receiving member 552 and the container base 553. When the toner container 551 is to be replaced or the toner container 551 is to be removed from the image formation apparatus, the controller 5 rotates the screw shaft 556c of the driving section 556 in response to opening of the cover (not shown) of the image formation apparatus 1 covering the toner container 551 or according to a signal sent through a toner replacement button operated by the user. Accordingly, the container base 553 moves up and down.

More specifically, the driving section 556 moves the container base 553 to a position immediately before the conveying pipe 554 is inserted into the toner container 551 or to a position where the conveying pipe 554 is removed from the toner container 551. More specifically, the driving section 556 moves the container base 553 up to a position where a weight of the toner container 551 is measured without a hitch, that is, where the conveying pipe 554 does not catch on the toner container 551 or the container receiving member 552 so that the toner container 551 will not erroneously be weighted.

The measurement unit (piezoelectric element) 555 converts force pressurized to the measurement unit (piezoelectric element) 555 at a position where the toner container 551 is weighted without a hitch, that is the weight of the toner container 551 to a voltage, and outputs the voltage to the conversion unit 558. The conversion unit 558 has a table showing a relation between voltages output from the measurement unit (piezoelectric element) 555 and the toner weights within the toner container 551. This conversion unit 558 converts the voltage output from the measurement unit (piezoelectric element) 555 to a toner weight based on this table and output the weight to the consumption information management apparatus 503.

The consumption information management apparatus 503 shown in FIG. 14 comprises the weight acquiring unit 503a, temporary memory 503e that stores the weight T2 of the developer last measured, and the information converting unit 503b that calculates a weight of developer consumed from the time when it is last measured until measured this time based on the weight T2 of the last measured developer stored on the temporary memory 503e and the weight T1 of the developer measured this time. This consumption information management apparatus 503 also comprises the memory 503d that stores cumulative consumption information, and the cumulative consumption information calculating unit 503c that adds the weight of developer consumed from the time when it is last measured until measured this time calculated in the information converting unit 503b, to the cumulative consumption information up to the last time stored in the memory 503d, updates the cumulative consumption information, and writes it in the memory 503d.

When the consumption information is to be calculated, the weight measurement unit 550 measures the weight T1 of the developer, the weight acquiring unit 503a loads the measured weight T1 into the consumption information management apparatus 503 and sends it to the information converting unit 503b. The information converting unit 503b reads the weight T2 of the last measured developer from the temporary memory 503e, calculates the weight T1–T2 of the developer consumed from the time when it is last measured until measured this time based on the read-out weight T2 and the weight T1 of the developer measured this time, and determines the weight as a weight of consumed developer.

The calculated consumed weight of developer is sent to the cumulative consumption information calculating unit 503c. The cumulative consumption information calculating unit 503c reads out the cumulative consumption information up to that last measured from the memory 503d, adds the weight T1–T2 of the developer consumed from the time when it is last measured until measured this time, to the read out information, and stores the sum in the memory 503d again.

The processing for calculating cumulative consumption information of the consumption information management apparatus in FIG. 14 will be explained below with reference to FIG. 15. The flow chart shown in FIG. 15 shows the processing for calculating cumulative consumption information of the consumption information management apparatus in FIG. 14. In the image formation apparatus of this example, when the developer is to be replaced, a specified cover (hereinafter described simply "cover") is assumed to be opened to perform its replacement.

In FIG. 15, after the power to the main body of the image formation apparatus is turned on (step S21), the developer is weighted. This is for the purpose of coping with a case where the developer is replaced while the power to the main body is off. More specifically, data for the weight of the developer measured by the weight measurement unit 550 is sent to the consumption information management apparatus 503. The weight acquiring unit 503a acquires the weight T2 of the developer as an initial value (step S22), and stores the weight T2 of the developer in the temporary memory 503e (step S23).

The controller 5 detects at all times whether the cover is in an opened state or a closed state (step S24). Whether the cover is in an opened state or a closed state can be detected by using any of the known means. For example, a projection is provided on the rear surface of the cover, and the projection is in contact with a specific part of the machine in the cover-closed state and is kept away from the part in the cover-opened state. By electrically detecting this contact, it is possible to detect whether the cover is in the opened state or closed state.

When the cover is in the closed state (step S24, "N"), the controller 5 checks a power OFF signal (step S25). When the power is turned off, the consumption information management apparatus 503 measures again a weight of the developer in the same manner as that when the initial value T2 is acquired (the step S25), and acquires a final value T1 (step S26). Subsequently, the information converting unit 503b reads out T2 from the temporary memory 503e, and calculates T1–T2 to obtain consumption information (step S27). The image formation apparatus of this embodiment is controlled so that the apparatus measures the weight of the developer when the power-off signal is received and operates only during the time of acquiring cumulative consumption information. In order to acquire the cumulative consumption information without fail even at the time of a power failure, an auxiliary power unit and the like may be used.

The cumulative consumption information calculating unit 503c reads the cumulative consumption information from the memory 503d, adds a newly consumed portion T1–T2 to the read-out information to obtain new cumulative information, and stores this information in the memory 503d (step S28).

On the other hand, when the cover is opened before the power for the image formation apparatus 1 is turned off (step S24, "Y"), a cover-open signal is sent to the controller 5. In response to this, the consumption information management apparatus 503 measures again a weight of the developer in the same manner as that when the initial value T2 is acquired (the step S22), and acquires a final value T1 (step S29).

The information converting unit 503b reads out T2 from the temporary memory 503e, and calculates T1–T2 to obtain consumption information (step S30). After this processing, the cumulative consumption information calculating unit 503c reads out the cumulative consumption information from the memory 503d, adds a newly consumed portion T1–T2 to the read-out information to obtain new cumulative information, and stores this information in the memory 503d (step S31).

When the cover is closed (step S32, "Y"), a renewed initial value T2 is acquired. Based on such control, it is also possible to obtain the consumption information for the developer by measuring the weight of the developer.

The service man may give an instruction to acquire cumulative consumption information through the control panel and acquire the cumulative consumption information for developer at given timing. In this case, it may be determined at step S24 whether the cover has been opened or the instruction to acquire cumulative consumption information has been issued.

As explained above, the weight measurement unit (measurement equipment) 550 that can measure the weight of the toner container 551 is provided in the image formation apparatus, and the weight measurement unit acquires change in weight of the toner container 551 to calculate a quantity of consumed developer. Thus, it is possible to accurately calculate the consumed quantity and remaining quantity of the developer based on the actually measured value.

The weight of the toner container 551 is calculated at the time of opening and closing the cover or of turning ON and OFF the power to the main body. Thus, it is also possible to accurately calculate the consumed quantity and remaining quantity of the developer even when the developer is replaced.

By the way, an image forming device with high durability requires improved durability of developer to be consumed. In this case, a method of consuming toner and carrier particles encapsulated in a container (image visualizing agent container) is used. More specifically, the carrier particles are mainly formed with magnetic body, which charges the toner by friction. In such a method, the quality of developer can be maintained by replacing the carrier as well. It is also possible to measure change in weight of the developer in the above-mentioned manner even in the method of consuming both the toner and carrier.

Some of image forming devices uses a liquid developing method. By encapsulating liquid developer in a toner container in such a liquid developing method, it is also possible to measure change in weight of consumed liquid developer in the same manner as that of the powder toner.

There is also an image forming device having a container with not only the liquid developer but also a solvent for diluting the liquid developer encapsulated. It is possible to measure respective changes in both weights of the consumed liquid developer and solvent for diluting the liquid developer in the same manner as explained above.

[Another Examples of the Image Formation Apparatus]

Figure 16:
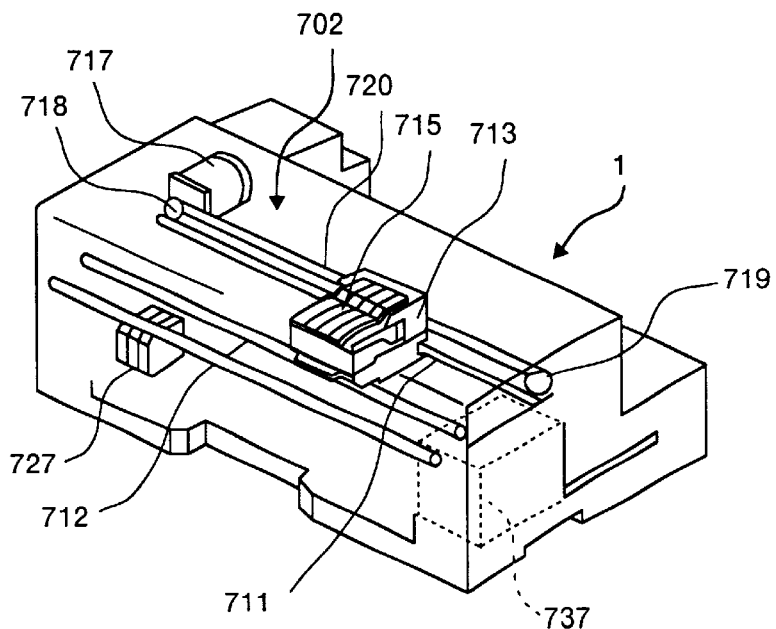
FIG. 16 shows a side view of a key structure of an image formation apparatus formed with an ink-jet recording device according to another example of the image formation apparatus.
Figure 17:
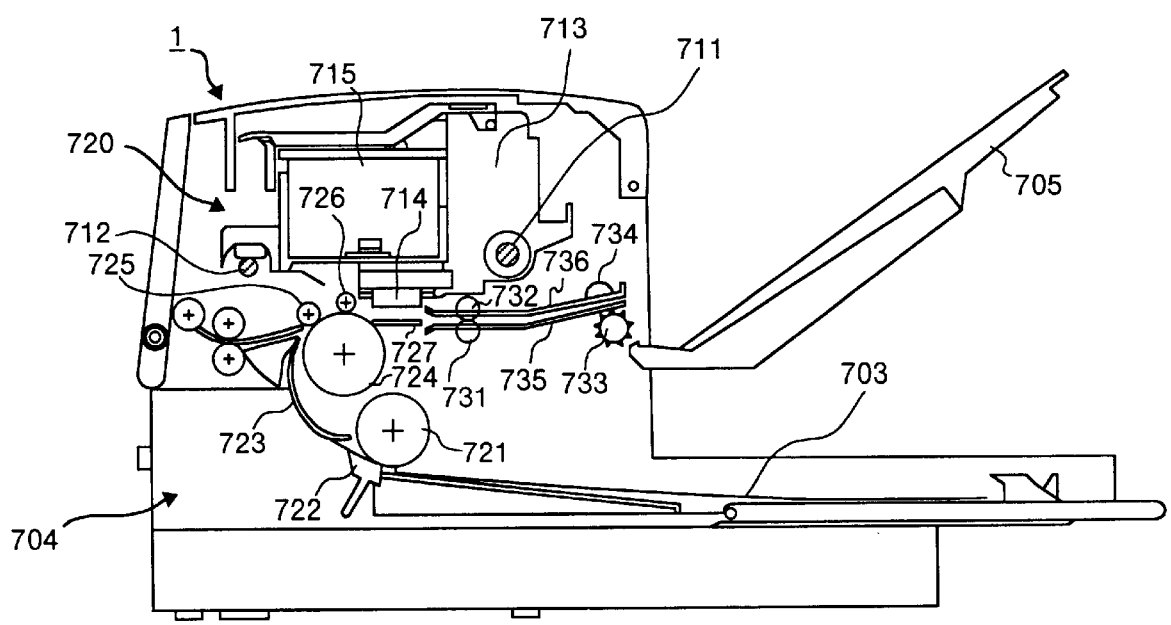
FIG. 17 is a schematic cross-sectional view of the image formation apparatus formed with the ink-jet recording device according to another example of the image formation apparatus in FIG. 16.

The above explanation has been given assuming that the electrophotographic copier is used as the image forming device. However, an ink-jet recording device may be used as the image formation apparatus of this invention. FIG. 16 shows a side view of the key structure of the image formation apparatus 1 formed with the ink-jet recording device. FIG. 17 is a schematic cross-sectional view of the image formation apparatus 1 formed with the ink-jet recording device.

In FIG. 16 and FIG. 17, this ink-jet recording device accommodates a carriage movable in the main scanning direction, a recording head formed with an ink jet head mounted on the carriage, and an printing mechanism section 702 formed with an ink cartridge for supplying ink to the recording head or the like inside the main body of the device 1. A paper feeder cassette (or may be an output tray) 704, which can load a large number of paper 703, can be mounted on the lower side of the main body of the device 1 so that it can be removed from its front side. The ink-jet recording device takes in a paper 703 fed from the paper feeder cassette 704 or a manual feeder tray 705, records a specific image on the paper by the printing mechanism section 702, and drops the paper into the output tray 706 mounted on the rear side.

The printing mechanism section 702 holds the carriage 713 slidably in the main scanning direction (in a direction perpendicular to the paper surface of FIG. 17) with a main guide rod 711 and a secondary guide rod 712 as guide members spanning across the side plates, not shown. This carriage 713 has the heads 714 with ink jets that eject ink droplets of respective colors: yellow (Y), cyan (C), magenta (M), and black (K). More specifically, these heads 714 are mounted on the carriage 713 so that the plurality of ink jets are arranged in the direction intersecting the main scanning direction and are directed downward. Further, ink cartridges 715 for feeding ink of the respective colors to the heads 714 are mounted on the carriage 713 so as to be replaceable.

Each of the ink cartridges 715 has an air port, which communicates with air, disposed on its upper side, and a supply port, which feeds ink to each of the ink jet heads, disposed on its lower side. The ink cartridge 715 also has a porous body filled with ink in its internal side, so that the ink fed to the ink jet head through a capillary force of the porous body is maintained as a slight load.

As a recording head, the heads 714 for the respective colors are used, but one head having nozzles that jet respective color ink may be used. Further, as an ink jet head used as the head 714, a piezoelectric type, a bubble type, or an electrostatic type can be used. More specifically, the piezoelectric type pressurizes ink through a diaphragm as an electromechanical transducer such as an piezoelectric element forming a wall surface of a liquid chamber. The bubble type pressurizes ink by generating bubbles with a heating resistor. The electrostatic type pressurizes ink by displacing a diaphragm with an electrostatic force between the diaphragm forming a wall surface of an ink channel and an electrode opposite to the diaphragm. This embodiment uses the electrostatic type ink jetting.

The rear side (the downstream side in the paper conveying direction) of the carriage 713 is slidably engaged with the main guide rod 711, and its front side (the upstream side in the paper conveying direction) is slidably placed on the secondary guide rod 712. In order to move and scan this carriage 713 in the main scanning direction, a timing belt 720 is stretched between a driving pulley 718 rotated by a main scan motor 717 and a driven pulley 719, and this timing belt 720 is fixed to the carriage 713. Thus, the carriage 713 is so driven as to reciprocate through normal or reverse rotation of the main scan motor 717.

On the other hand, in order to convey the paper 703 set in the paper feeder cassette 704 to the underside of the head 714, the ink-jet recording device comprises the paper feeding roller 721 and friction pad 722 that separate and feed the paper 703 from the paper feeder cassette 704, guide member 723 that guides the paper 703, conveying roller 724 that reverses and conveys the fed paper 703, conveying roller 725 pressed onto the circumferential surface of the conveying roller 724, and the tip end roller 726 that defines a feeding angle of the paper 703 from the conveying roller 724. The conveying roller 724 is rotated by an auxiliary scan motor 727 through a gear array.

The ink-jet recording device also has a print receiving member as a paper guide member that guides the paper 703, fed out from the conveying roller 724, to the underside of the recording head 714 corresponding to a range where the carriage 713 moves in the main scanning direction,. The image formation apparatus further has the paper output roller 731 and pulley 732 that feed out the paper 703 in the paper outputting direction, paper output roller 733 and pulley 734 that further feed out the paper 703 to the output tray 706, and the guide members 735 and 736 that form a paper output path, which are disposed on the downstream side in the paper conveying direction of the print receiving member.

On recording, by driving the recording head 714 based on an image signal while the carriage 713 is moved, the ink is ejected onto the stopped paper 703 to record by one line, and after the paper 703 is conveyed by a predetermined quantity, recording for the next line is performed. By receiving a record end signal or a signal indicating that the rear edge of the paper 703 has reached a recording area, the recording operation is ended and the paper 703 is output.

A recovery device 737 that recovers insufficient ejection of the head 714 is disposed at the position which is away from the recording area on the right side in the moving direction of the carriage 713. The recovery device 737 has a capping unit, a sucking unit, and a cleaning unit. The carriage 713 is moved to the side of the recovery device 737 and is capped during its standby state for printing. Thus, unsuccessful ejection of ink due to dried ink can be prevented by keeping the ejecting port in a wet state. Further, by ejecting any ink having no relation with recording in the middle of recording, the viscosity of ink at all the ink jets is made even, thus maintaining stable ejecting property.

When the unsuccessful ejection has occurred, the recovery device 737 seals the ink jet of the head 714 with the capping unit, sucks bubbles together with the ink from the ink jet by the sucking unit through a tube, and removes the ink or dirt deposited on the ejection surface by the cleaning unit to recover the ejection failure. The sucked ink is discharged to a waste ink reservoir (not shown), and is absorbed and held by the ink absorber inside the waste ink reservoir.

Although the figure of the consumption information management apparatus 503 using the ink jet system is omitted, the quantity of ink consumption can also be calculated in the manner explained with reference to FIG. 13 and FIG. 14 (Another example 4 of the consumption information management apparatus). More specifically, ink is encapsulated in an ink container, and the ink container is weighted in the same manner as that of FIG. 13 and FIG. 14 to calculate the quantity of ink consumption.

Further, in order to achieve high quality of an image on normal paper, there is some ink jet system such that not only ink droplet but also an ink absorbing agent are ejected so as not to blur the ejected ink droplet on the paper. In order to improve waterproof property of a dye-base ink, there is some ink jet system such that an ink reacting agent, which alters the quality of waterproof property of the dye-base ink to high degree of waterproof property, is ejected. These ink absorbing agent and ink reacting agent are encapsulated in the image visualizing agent container, and the change in weight of the liquid can be measured in the same manner as that of FIG. 13 and FIG. 14.

When the ink, ink absorbing agent and the ink reacting agent are to be measured, the toner container of FIG. 13 is used as an ink container, an absorbing-agent container, and a reacting-agent container, and the conveying pipe 554 conveys the ink, ink absorbing agent, and the ink reacting agent. When these containers are discretely formed or when the ink, ink absorbing agent, and the ink reacting agent are encapsulated in one container, the container is weighted in the same manner as that of the FIG. 13 and FIG. 14. Thus, respective consumed quantities of the ink, ink absorbing agent, and the ink reacting agent can also be calculated.

In the ink jet system, respective quantities of the used ink, ink absorbing agent, and the ink reacting agent can also be simulated, and the quantity of ejected liquid can be calculated based on the digital image signal for ejecting droplet. The configuration of the consumption information management apparatus in this case has almost the same as that of the consumption information management apparatus 503 shown in FIG. 6, and the quantity of ink consumption is calculated instead of the quantity of toner consumption.

A case where the ink, ink absorbing agent, and the ink reacting agent are used for any purpose other than the image formation refers to a case where ink droplets are ejected in the direction other than the recording medium in order to ensure recording quantity of the image formation apparatus 1, in which a cleaning process is performed to prevent the ink nozzle head from its clogging.

When ink droplets are ejected in the direction other than the recording medium in order to ensure the recording quality of the image formation apparatus, a computation may be so performed that the cumulative consumption information for the quantity of the consumed image visualizing agent is not changed or is decreased based on the information from the detection unit.

Accordingly, when the ink droplets are jetted in a direction other than the recording medium, the cumulative consumption information for the consumed quantity of the image visualizing agent is not added based on the information from the detection unit. Therefore, it is prevented to charge the cost for the ink droplets (the quantity of ink ejected to prevent nozzle-clogging of the ink jet head) jetted in the direction other than the recording medium, to the user. That is, its actually used quantity can be calculated by providing a computation unit which performs a computation for not changing or decreasing the cumulative consumption information for the consumed quantity of the ink, ink absorbing agent, and the ink reacting agent based on the information used for any purpose other than the image formation.

A consumption information management system and an image formation apparatus according to a second embodiment of this invention will be explained below with reference to FIG. 18. In the first embodiment, the image formation apparatus 1 (consumption information management apparatus 503) calculates a charge for used toner. However, in the second embodiment, the image formation apparatus 1 transmits the calculated quantity of toner consumption to the service center 600 through the communication line 12, while the service center 600 calculates a charge for used toner based on the quantity of toner consumption transmitted from the image formation apparatus 1 and issues a bill for the toner.

The consumption information management system, image formation apparatus 1, and the consumption information management apparatus 503 according to the second embodiment have the same configuration of that of the first embodiment. Toner will be taken up as an example of the image visualizing agent in the following explanation, but the other image visualizing bodies explained in the first embodiment can be used in the same manner as explained above.

The memory 503*d* of the consumption information management apparatus 503 stores the cumulative quantity T1 of toner used since the image formation apparatus is manufactured, the quantity T2 of toner used until the last billing, and the total number of times K of image forming operation since the image formation apparatus is manufactured.

In the service center 600, the external storage device 602 stores the identifying information ID received from the image formation apparatus 1, the cumulative quantity T1 of toner used since the image formation apparatus 1 is manufactured, the quantity T2 of toner used until the last billing, and the total number of times K of image forming operation since the image formation apparatus is manufactured. The controller 601 performs various processing such as calculation of a charge for toner and billing for the toner.

Figure 18:
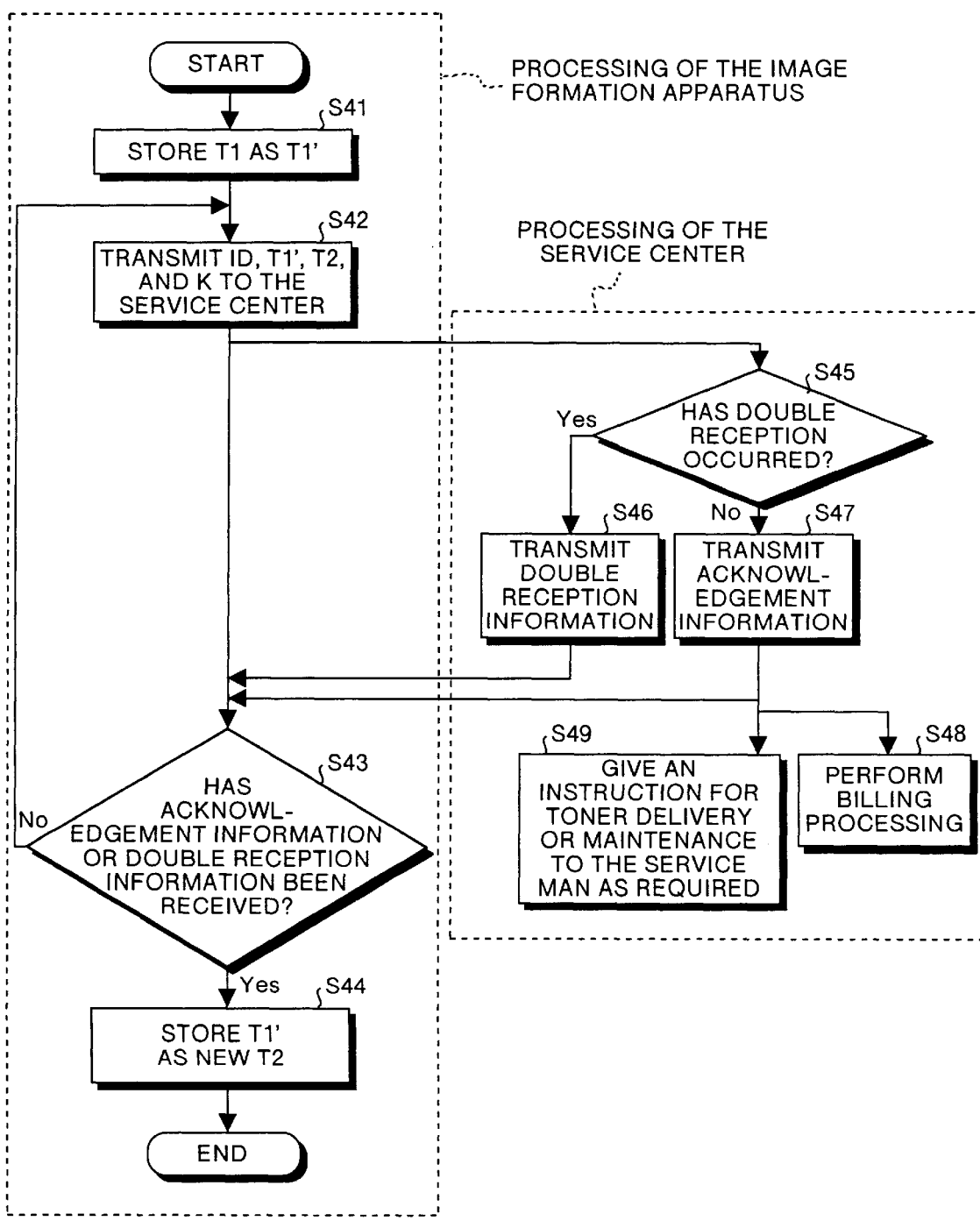
FIG. 18 is a flow chart showing operation of a consumption information management apparatus according to a second embodiment of this invention.

FIG. 18 is a flow chart showing the operation of the consumption information management apparatus according to the second embodiment (See FIG. 1). The processing performed by the service center 600 will be explained below with reference to FIG. 18. More specifically, this processing for automatically issuing a bill for the toner is executed when the date to issue the bill has come.

The image formation apparatus 1 temporarily stores the cumulative quantity T1 of toner used since the image formation apparatus 1 is manufactured until the data to issue the bill, as T1' differently from T1 (step S41).

Subsequently, the image formation apparatus 1 automatically transmits the identifying information ID, the cumulative toner quantity T1', the cumulative quantity T2 of toner used until the last billing, and the total number of times K of image forming operation since the image formation apparatus 1 is manufactured, to the service center 600 through the communication line 12 (step S42).

When having received the identifying information ID, the cumulative toner quantity T1', the cumulative quantity T2 of toner used until the last billing, and the total number of times K of image forming operation since the image formation apparatus 1 is manufactured from the image formation apparatus 1, the service center 600 verifies the information against the data already stored in the external storage device 602, and determines whether the information has been received (step S45). Whether or not the information has been received is determined because it is assumed that, although the service center 600 has acquired the cumulative toner quantity T1', the cumulative toner quantity T2, and the total number of times K of image forming operation, the image formation apparatus does not receive acknowledgement of receipt of the information from the service center 600 due to some error, so that the image formation apparatus 1 sends again the same information to the service center 600.

At step S45, when it is determined as double reception, the service center 600 does not issue a bill but sends information for double reception to the image formation apparatus 1 (step S46). On the other hand, at step S45, when it is determined that double reception does not occur, the service center 600 automatically checks reception of all the information such as the identifying information ID of the image formation apparatus 1, the cumulative toner quantity T1', the cumulative quantity T2 of the toner used until the last billing, and the total number of times K of image forming operation since the image formation apparatus 1 is manufactured. The service center 600 then automatically sends back an acknowledgement signal to the image formation apparatus 1 (step S47). The reason that the acknowledgement signal is sent back when the reception is acknowledged is because a case as follows is assumed. That is, it is assumed that the service center 600 may not receive the information correctly from the image formation apparatus 1 due to some failures of the communication line 12.

The image formation apparatus 1 recognizes that the bill has been issued at the time of last transmission of the information when the double reception information is received (step S43, "Y"), and stops the transmission of the information, and shifts the processing to step S44. When receiving the acknowledgement information (step S43, "Y"), the image formation apparatus 1 stops transmitting the information to the service center 600, and shifts the processing to step S44. When not receiving the acknowledgement information (step S43, "N"), the image formation apparatus 1 determines that some error may have occurred, and transmits again the information to the service center 600 after a predetermined period of time elapses (step S42).

At step S44, in the image formation apparatus 1, the cumulative toner quantity T1' is stored in the memory 503d as new T2, and the processing is ended.

On the other hand, the service center 600 sends back the acknowledgement signal, calculates a quantity of the toner T1'–T2 newly used the last billing until the present time based on the received cumulative toner quantities T1' and T2, and issues a bill for the toner as a target for the charge (step S48).

The service center 600 manages also the toner quantity. The service center 600 compares the toner quantity delivered to the user by the service man with the toner quantity used in the image formation apparatus 1, and sends the instruction to the service man if necessary (step S49). The service man having received the instruction delivers new toner to the user. At this time, the toner is delivered to the user without charge, so that a charge for the toner is not made. Only the toner quantity actually used by the user is charged.

Further, the service center 600 determines whether the image formation apparatus 1 needs maintenance based on the cumulative quantity T of toner used since the image formation apparatus 1 is manufactured and the total number of times K of image forming operation since the image formation apparatus 1 is manufactured. The service center 600 then sends the instruction to the service man if necessary (step S49). The service man having received the instruction visits the user and performs some necessary inspection and replacement. At this time, it becomes possible to easily perform replacement of the image forming section while the quantity of cumulative toner consumption stored in the memory 503d is kept as it is because the developing unit 203, charger 202, photoreceptor 201, and the cleaning device 204 as the image forming section are integrated into one unit, which is removable from the image formation apparatus independently from the consumption information management apparatus 503.

The image formation apparatus 1 of this embodiment automatically makes an order if the toner inside the apparatus becomes less in quantity. As a unit for recognizing that the toner becomes less in quantity, a known sensor can be utilized, such as a unit for measuring electric resistance disposed within a toner storage container. When an automatic ordering instruction has been issued, the service center 600 automatically sends new toner to the user. A transportation fee at this time is put on the maker. The toner is not charged unless it is used. Therefore, it is possible to maintain a situation such that the user never runs out of toner without any economical load on the user.

As explained above, in the second embodiment, the image formation apparatus 1 transmits cumulative consumption information to the service center 600, while the service center 600 calculates a charge for used toner based on the cumulative consumption information and issues a bill.

Therefore, the processing for adjustment of the charge for toner is speedily carried out. Thus, billing for image visualizing agent used in the image formation apparatus and collecting the money for it become easier to manage.

[Stopping of Use of the Image Formation Apparatus]

When the use of the image formation apparatus 1 is stopped on the expiration of a rental period or due to replacement of models, the service man makes a charge for toner based on the quantity of cumulative toner consumption, and takes back the image formation apparatus 1 with him. At this time, the service man does not make a charge for the not-yet-used toner remaining in a toner bottle. Therefore, the user pays only for the toner actually used, which is economical. This becomes a merit particularly in the color image formation apparatus having less possibility such that the apparatus may run out of developer of all colors at the same time.

[Failure of the Image Forming Section]

The image formation units such as the developing device 203, charger 202, photoreceptor 201, and the cleaning device 204, which constitute the image forming section of the image formation apparatus 1, are integrated into one unit, and are removable from the image formation apparatus 1 independently from the consumption information management apparatus 503. Therefore, when any of the image formation units of the image forming section is at fault, only the faulty image formation unit can be replaced. Accordingly, it is possible to speedily replace only the faulty image formation unit while the quantity of cumulative toner consumption stored in the memory 503d is kept as it is.

It should be noted that the present invention is not limited by the above-mentioned embodiments and that modification and variation of this invention are possible without departing from the spirit and scope thereof.

As explained above, the consumption information management apparatus according to one aspect of this invention comprises the consumption information acquisition unit which acquires the quantity of image visualizing agent consumed through image formation in the image formation apparatus as consumption information; the cumulative consumption information calculating unit which accumulates the consumption information for an unadjusted quantity of the image visualizing agent acquired by the consumption information acquisition unit and calculates cumulative consumption information; the storage unit which stores the cumulative consumption information; and the charge determination unit which determines a charge for the used image visualizing agent based on the cumulative consumption information stored in the storage unit. Therefore, the cost for the developer remaining within the image formation apparatus can be prevented from being charged to the user, so that the user may pay only for the quantity of used image visualizing agent, which makes it possible to reduce a load on the user. Further, a quantity of the image visualizing agent remaining within the image formation apparatus can be calculated. Thus, there is an excellent effect that it is possible to resolve inconvenience such that the user is charged for the quantity of the image visualizing agent remaining within the image formation apparatus.

Further, the consumption information acquisition unit acquires the consumption information based on one of or a combination of those information for: a) density of a digital image signal, b) an amount of energy that a writing unit consumes when the image formation apparatus has the writing unit for writing a latent image, c) a light emitting time of an optical writing unit when the image formation apparatus has the optical writing unit for optically writing a latent image, d) a driving time of a toner conveying unit for conveying toner to a developing device, e) the number of rotation of a screw when the toner conveying unit, which conveys toner to the developing device, conveys toner through rotation of the screw, and f) ink jetting based on a digital image signal when the image formation apparatus is an ink-jet recording device. Therefore, in addition to the effect due to the invention, there is an excellent effect that it is possible to acquire the quantity of consumed image visualizing agent with a simply configuration and method.

Further, the consumption information acquisition unit acquires the consumption information based on the result of measuring in a weight measurement unit, disposed inside the image formation apparatus, which measures a weight of an image visualizing agent container for accommodating the image visualizing agent. Therefore, there is an excellent effect that it is possible to acquire a quantity of consumed image visualizing agent based on actual measurement and acquire an accurate quantity of the consumed image visualizing agent.

Further, the consumption information acquisition unit acquires the consumption information at the time of turning ON and OFF the power to the main body of the image formation apparatus, or of opening and closing a cover that covers the image visualizing agent container. Therefore, in addition to the effect due to the invention, there is an excellent effect that it is possible to acquire an accurate quantity of the consumed image visualizing agent even when the image visualizing agent container is removed from the image formation apparatus or when a new image visualizing agent container is installed in the image formation apparatus.

Further, the consumption information acquisition unit sets an error in calculation of the quantity of the consumed image visualizing agent to be within 10%. Therefore, in addition to the effect due to the invention, there is an excellent effect that it is possible to accurately calculate a charge for the used image visualizing agent.

Further, the storage unit determines a value of $3.1 \cdot X(mg)$ or less as a unit of recording the quantity of the consumed image visualizing agent, assuming that the quantity of the consumed image visualizing agent per 1 square cm of an image to be stored is $X(mg)$ when the image is formed over the whole surface of a recording medium where the image is to be recorded. Therefore, in addition to the effect due to the invention, there is an excellent effect that it is possible to manage the consumed quantity by suppressing an error between the quantity of consumed developer stored in the storage unit and the quantity of the actually consumed developer to within about 10%.

Further, the cumulative consumption information calculating unit includes the computation unit that performs a computation for not changing or decreasing the cumulative consumption information for the image visualizing agent when it is determined that a transfer material has jammed based on information from the jam detection unit, which detects a jam of the transfer material as a recording medium where the image is to be recorded. Therefore, in addition to the effect due to the invention, there is an excellent effect that it is possible to prevent the cost for the developer consumed due to the jam from being charged to the user because the cumulative consumption information for the developer consumed due to the jam of the transfer material is not added to the charge.

Further, the cumulative consumption information calculating unit includes a computation unit that performs a computation for not changing or decreasing the cumulative consumption information for the quantity of the consumed image visualizing agent when it is determined that the apparatus is under maintenance based on the information for whether the image formation apparatus is under maintenance. Therefore, there is an excellent effect that it is possible to prevent the cost for the developer consumed due to the maintenance from being charged to the user because the cumulative consumption information for the image visualizing agent consumed due to the maintenance is not added to the charge.

Further, the charge determination unit determines a charge so that an amount of money for consumed image visualizing agent becomes any value in a predetermined unit or more. Therefore, in addition to the effect due to the invention, there is an excellent effect that it is possible to lighten a load for adjusting the charge because the user or the service man need not prepare many changes for adjustment of the charge.

Further, the consumption information management apparatus further comprises the display unit which displays the cumulative consumption information stored in the storage unit or the charge computed based on the cumulative consumption information. Therefore, in addition to the effect due to the invention, there is an excellent effect that it is possible to lighten a load on the service man to calculate a charge for developer at the time of charging by displaying a value on the display unit as the amount of money for the developer to be actually charged, and that the user can easily check the amount for the developer.

Further, the storage unit is formed with a nonvolatile memory. Therefore, in addition to the effect due to the invention, there is an excellent effect that it is possible to rigidly manage the charge for the developer without destruction of the information stored in the storage unit due to a power failure or some other failures.

The image formation apparatus according to another aspect of this invention comprises the consumption information management apparatus and the image formation unit including the developing unit which performs development with image visualizing agent used to form an image. Therefore, there is an excellent effect that it is possible to provide the image formation apparatus capable of managing the charge for the used image visualizing agent.

Further, the whole or a part of the image formation unit is removable from the main body of the image formation apparatus as a separate unit with respect to the consumption information management apparatus. Therefore, in addition to the effect due to the invention, there is an excellent effect that when the image formation unit is at fault, it is possible to speedily replacing only the faulty image formation unit through such replacement.

Further, the image formation apparatus further comprises the locking unit which fixes the unit to the main body of the image formation apparatus. Therefore, in addition to the effect due to the invention, there is an excellent effect that when the image formation unit is at fault, it is possible to speedily replacing only the faulty image formation unit through such replacement.

The consumption information management system according to still another aspect of this invention is architected with the consumption information management apparatus and the service center that are connected through a communication line so as to enable data communications. The consumption information management apparatus includes the consumption information acquisition unit which acquires the quantity of image visualizing agent consumed through image formation in the image formation apparatus as consumption information; the cumulative consumption information calculating unit which accumulates the consumption information for an unadjusted quantity of the image visualizing agent acquired by the consumption information acquisition unit and calculates cumulative consumption information; the storage unit which stores the cumulative consumption information; the charge determination unit which calculates a charge for the used image visualizing agent based on the cumulative consumption information stored in the storage unit; and the cumulative consumption information transmitting unit which transmits the cumulative consumption information stored in the storage unit to the service center. The service center includes the cumulative consumption information receiving unit which receives the cumulative consumption information transmitted from the image formation apparatus; and the first billing unit which determines a charge for used image visualizing agent based on the received cumulative consumption information, and issues a bill for the used image visualizing agent in the image formation apparatus. Accordingly, the processing for adjustment of the charge for the developer is speedily performed. Therefore, there is an excellent effect that it is possible to facilitate management of billing for the image visualizing agent used in the image formation apparatus and collection of the money for it.

Further, the service center includes an acknowledgement sending unit which sends acknowledgement information indicating reception of the cumulative consumption information to the image formation apparatus when the cumulative consumption information receiving unit has received the cumulative consumption information. While, in the consumption information management apparatus, when not receiving the acknowledgement information after a predetermined period of time elapses since the cumulative consumption information is transmitted, the cumulative consumption information transmitting unit transmits again the cumulative consumption information to the image formation apparatus. Therefore, in addition to the effect due to the invention, there is an excellent effect that the service center can receive the cumulative consumption information without fail.

Further, the service center further includes a double reception information sending unit. More specifically, when the cumulative consumption information receiving unit has already received the same cumulative consumption information as the cumulative consumption information just received, the double reception information sending unit transmits the double reception information indicating that the same information has already been received to the image formation apparatus. The charging unit does not charge for the received cumulative consumption information when the same information has already been received. Therefore, there is an excellent effect that it is possible to prevent double issue of the bill.

Further, the service center further includes a second billing unit that determines a charge for maintenance of the image formation apparatus based on the received cumulative consumption information, and issues a bill for the maintenance of the image formation apparatus. Therefore, there is an excellent effect that it is possible to prevent a bill with the cost amount for the image visualizing agent during maintenance, which is not used by the user, from being issued to the user.

Further, the consumption information management apparatus further comprises an ordering unit which automatically orders the image visualizing agent to the service center as required. Therefore, in addition to the effect due to the invention, there is an excellent effect that it is possible to resolve inconvenience for the user due to shortage of the developer for the image formation apparatus by ordering new image visualizing agent before the image formation apparatus runs out of the developer.

The present document incorporates by reference the entire contents of Japanese priority documents, 2000-296039 filed in Japan on Sep. 28, 2000, and 2001-290167 filed in Japan on Sep. 21, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A consumption information management apparatus comprising:
   a consumption information acquisition unit which acquires a quantity of image visualizing agent consumed through image formation in an image formation apparatus as consumption information;
   a cumulative consumption information calculating unit which accumulates the consumption information for unadjusted quantities of said image visualizing agent acquired by said consumption information acquisition unit and calculates cumulative consumption information;
   a storage unit which stores the cumulative consumption information; and
   a charge determination unit which determines a charge for said used image visualizing agent based on the cumulative consumption information stored in said storage unit,
   wherein said consumption information acquisition unit sets an error in calculation of the quantity of said consumed image visualizing agent to be within 10%.

2. A consumption information management apparatus comprising:
   a consumption information acquisition unit which acquires a quantity of image visualizing agent consumed through image formation in an image formation apparatus as consumption information;
   a cumulative consumption information calculating unit which accumulates the consumption information for unadjusted quantities of said image visualizing agent acquired by said consumption information acquisition unit and calculates cumulative consumption information;
   a storage unit which stores the cumulative consumption information; and
   a charge determination unit which determines a charge for said used image visualizing agent based on the cumulative consumption information stored in said storage unit,
   wherein said storage unit determines a value of 3.1·X(mg) or less as a unit of recording the quantity of said consumed image visualizing agent, assuming that the quantity of said consumed image visualizing agent per 1 square cm of an image to be stored is X(mg) when said image is formed over the whole surface of a recording medium where said image is to be recorded.

3. The consumption information management apparatus according to claim 1, wherein said cumulative consumption information calculating unit includes a computation unit that performs a computation for not changing or decreasing the cumulative consumption information for said image visualizing agent when it is determined that a transfer material has jammed based on information from a jam detection unit which detects a jam of said transfer material as a recording medium where said image is to be recorded.

4. The consumption information management apparatus according to claim 1, wherein said cumulative consumption information calculating unit includes a computation unit that performs a computation for not changing or decreasing the cumulative consumption information for the quantity of said consumed image visualizing agent when it is determined that said apparatus is under maintenance based on the information for whether said image formation apparatus is under maintenance.

5. The consumption information management apparatus according to claim 1, wherein said charge determination unit determines a charge so that an amount of money for consumed image visualizing agent becomes any value in a predetermined unit or more.

6. The consumption information management apparatus according to claim 1, further comprising:
   a display unit which displays cumulative consumption information stored in said storage unit or the charge computed based on the cumulative consumption information.

7. The consumption information management apparatus according to claim 1, wherein said storage unit is formed with a nonvolatile memory.

8. A consumption information management apparatus comprising:
   a consumption information acquisition unit which acquires a quantity of image visualizing agent consumed through image formation in an image formation apparatus as consumption information;
   a cumulative consumption information calculating unit which accumulates the consumption information for unadjusted quantities of said image visualizing agent acquired by said consumption information acquisition unit and calculates cumulative consumption information;
   a storage unit which stores the cumulative consumption information; and
   a charge determination unit which determines a charge for said used image visualizing agent based on the cumulative consumption information stored in said storage unit,
   wherein said consumption information acquisition unit acquires consumption information based on one of or a combination of those information for:
      an amount of energy consumed by a writing unit when said image formation apparatus has said writing unit for writing a latent image;
      a light emitting time of an optical writing unit when said image formation apparatus has said optical writing unit for optically writing a latent image;
      a driving time of a toner conveying unit for conveying toner to a developing device;
      a number of rotation of a screw when said toner conveying unit, which conveys toner to said developing device, conveys toner through rotation of said screw; and
      ink jetting based on a digital image signal when said image formation apparatus is an ink-jet recording device.

9. The consumption information management apparatus according to claim 1, wherein said consumption information acquisition unit acquires the consumption information based on the result of measuring in a weight measurement unit, disposed inside said image formation apparatus, which measures a weight of an image visualizing agent container for accommodating said image visualizing agent.

10. The consumption information management apparatus according to claim 9, wherein said consumption information acquisition unit acquires the consumption information at the time of turning ON and OFF the power to the main body of said image formation apparatus, or of opening and closing a cover that covers said image visualizing agent container.

11. The consumption information management apparatus according to claim 8, wherein said consumption information acquisition unit sets an error in calculation of the quantity of said consumed image visualizing agent to be within 10%.

12. The consumption information management apparatus according to claim 8, wherein said storage unit determines a value of 3.1·X(mg) or less as a unit of recording the quantity of said consumed image visualizing agent, assuming that the quantity of said consumed image visualizing agent per 1 square cm of an image to be stored is X(mg) when said image is formed over the whole surface of a recording medium where said image is to be recorded.

13. The consumption information management apparatus according to claim 8, wherein said cumulative consumption information calculating unit includes a computation unit that performs a computation for not changing or decreasing the cumulative consumption information for said image visualizing agent when it is determined that a transfer material has jammed based on information from a jam detection unit which detects a jam of said transfer material as a recording medium where said image is to be recorded.

14. The consumption information management apparatus according to claim 8, wherein said cumulative consumption information calculating unit includes a computation unit that performs a computation for not changing or decreasing the cumulative consumption information for the quantity of said consumed image visualizing agent when it is determined that said apparatus is under maintenance based on the information for whether said image formation apparatus is under maintenance.

15. The consumption information management apparatus according to claim 8, wherein said charge determination unit determines a charge so that an amount of money for consumed image visualizing agent becomes any value in a predetermined unit or more.

16. The consumption information management apparatus according to claim 8 further comprising:
    a display unit which displays cumulative consumption information stored in said storage unit or the charge computed based on the cumulative consumption information.

17. The consumption information management apparatus according to claim 8, wherein said storage unit is formed with a nonvolatile memory.

18. An image formation apparatus comprising:
    a consumption information management apparatus including,
        a consumption information acquisition unit which acquires a quantity of image visualizing agent consumed through image formation in an image formation apparatus as consumption information,
        a cumulative consumption information calculating unit which accumulates the consumption information for unadjusted quantities of said image visualizing agent acquired by said consumption information acquisition unit and calculates cumulative consumption information,
        a storage unit which stores the cumulative consumption information, and
        a charge determination unit which determines a charge for said used image visualizing agent based on the cumulative consumption information stored in said storage unit; and
    an image formation unit including a developing unit which performs development with image visualizing agent used to form an image,
    wherein said consumption information acquisition unit sets an error in calculation of the quantity of said consumed image visualizing agent to be within 10%.

19. The image formation apparatus according to claim 18, wherein the whole or a part of said image formation unit is removable from the main body of said image formation apparatus as a separate unit with respect to said consumption information management apparatus.

20. The image formation apparatus according to claim 19 further comprising:
    a locking unit which fixes said unit to the main body of said image formation apparatus.

21. A consumption information management system architected with a consumption information management apparatus and a service center that are connected through a communication line so as to enable data communications, wherein said consumption information management apparatus includes:
    a consumption information acquisition unit which acquires a quantity of image visualizing agent consumed through image formation in an image formation apparatus as consumption information;
    a cumulative consumption information calculating unit which accumulates the consumption information for unadjusted quantities of said image visualizing agent acquired by said consumption information acquisition unit and calculates cumulative consumption information;
    a storage unit which stores the cumulative consumption information; and
    a cumulative consumption information transmitting unit which transmits the cumulative consumption information stored in said storage unit to said service center,
    wherein said service center includes:
        a cumulative consumption information receiving unit which receives the cumulative consumption information transmitted from said image formation apparatus;
        a charging unit which determines a charge for used image visualizing agent based on the received cumulative consumption information, and charges for the used image visualizing agent in said image formation apparatus; and
        an acknowledgement information sending unit which sends acknowledgement information indicating that the cumulative consumption information has been received to said image formation apparatus when said cumulative consumption information receiving unit has received the cumulative consumption information, and
    wherein said cumulative consumption information transmitting unit transmits again the cumulative consumption information to said service center when said unit does not receive the acknowledgement information after a predetermined period of time elapses since the cumulative consumption information is transmitted.

22. A consumption information management system architected with a consumption information management apparatus and a service center that are connected through a communication line so as to enable data communications, wherein said consumption information management apparatus includes:
  a consumption information acquisition unit which acquires a quantity of image visualizing agent consumed through image formation in an image formation apparatus as consumption information;
  a cumulative consumption information calculating unit which accumulates the consumption information for unadjusted quantities of said image visualizing agent acquired by said consumption information acquisition unit and calculates cumulative consumption information;
  a storage unit which stores the cumulative consumption information; and
  a cumulative consumption information transmitting unit which transmits the cumulative consumption information stored in said storage unit to said service center,
wherein said service center includes:
  a cumulative consumption information receiving unit which receives the cumulative consumption information transmitted from said image formation apparatus;
  a charging unit which determines a charge for used image visualizing agent based on the received cumulative consumption information, and charges for the used image visualizing agent in said image formation apparatus,
  wherein said service center further includes:
    when said cumulative consumption information receiving unit has already received the same cumulative consumption information as the cumulative consumption information just received,
    a double reception information sending unit which sends double reception information indicating that the cumulative consumption information has already been received to said image formation apparatus, and
    wherein said charging unit does not charge for the received cumulative consumption information when the same information has already been received.

23. A consumption information management system architected with a consumption information management apparatus and a service center that are connected through a communication line so as to enable data communications, wherein said consumption information management apparatus includes:
  a consumption information acquisition unit which acquires a quantity of image visualizing agent consumed through image formation in an image formation apparatus as consumption information;
  a cumulative consumption information calculating unit which accumulates the consumption information for unadjusted quantities of said image visualizing agent acquired by said consumption information acquisition unit and calculates cumulative consumption information;
  a storage unit which stores the cumulative consumption information; and
  a cumulative consumption information transmitting unit which transmits the cumulative consumption information stored in said storage unit to said service center, and wherein said service center includes:
  a cumulative consumption information receiving unit which receives the cumulative consumption information transmitted from said image formation apparatus;
  a charging unit which determines a charge for used image visualizing agent based on the received cumulative consumption information, and charges for the used image visualizing agent in said image formation apparatus; and
  a second billing unit that determines a charge for maintenance of said image formation apparatus based on the received cumulative consumption information, and issues a bill for the maintenance of said image formation apparatus.

24. The consumption information management system according to claim 21, wherein said consumption information management apparatus further comprises:
  an ordering unit which automatically orders said image visualizing agent to said service center as required.

25. An image formation apparatus comprising:
  a consumption information management apparatus including,
    a consumption information acquisition unit which acquires a quantity of image visualizing agent consumed through image formation in an image formation apparatus as consumption information,
    a cumulative consumption information calculating unit which accumulates the consumption information for unadjusted quantities of said image visualizing agent acquired by said consumption information acquisition unit and calculates cumulative consumption information,
    a storage unit which stores the cumulative consumption information, and
    a charge determination unit which determines a charge for said used image visualizing agent based on the cumulative consumption information stored in said storage unit; and
  an image formation unit including a developing unit which performs development with image visualizing agent used to form an image,
  wherein said storage unit determines a value of $3.1 \cdot X$ (mg) or less as a unit of recording the quantity of said consumed image visualizing agent, assuming that the quantity of said consumed image visualizing agent per 1 square cm of an image to be stored is $X(mg)$ when said image is formed over the whole surface of a recording medium where said image is to be recorded.

26. A consumption information management apparatus comprising:
  a consumption information acquisition unit which acquires a quantity of image visualizing agent consumed through image formation in an image formation apparatus as consumption information;
  a cumulative consumption information calculating unit which accumulates the consumption information for unadjusted quantities of said image visualizing agent acquired (by said consumption information acquisition unit and calculates cumulative consumption information;
  a storage unit which stores the cumulative consumption information; and
  a charge determination unit which determines a charge for said used image visualizing agent based on the cumulative consumption information stored in said storage unit, wherein the cumulative consumption information calculating unit multiplies the consumed quantity of the image visualization agent by a coefficient of not more than 1 when a predetermined quantity or more of the image visualization agent is cumulatively consumed such that a user is rewarded for using the predetermined quantity or more of the visualization agent.

27. The consumption information management apparatus according to claim 26, wherein said consumption information acquisition unit sets an error in calculation of the quantity of said consumed image visualizing agent to be within 10%.

28. The consumption information management apparatus according to claim 26, wherein said storage unit determines a value of 3.1·X(mg) or less as a unit of recording the quantity of said consumed image visualizing agent, assuming that the quantity of said consumed image visualizing agent per 1 square cm of an image to be stored is X(mg) when said image is formed over the whole surface of a recording medium where said image is to be recorded.

29. The consumption information management apparatus according to claim 26, wherein said cumulative consumption information calculating unit includes a computation unit that performs a computation for not changing or decreasing the cumulative consumption information for said image visualizing agent when it is determined that a transfer material has jammed based on information from a jam detection unit which detects a (jam of said transfer material as a recording medium where said image is to be recorded.

30. The consumption information management apparatus according to claim 26, wherein said cumulative consumption information calculating unit includes a computation unit that performs a computation for not changing or decreasing the cumulative consumption information for the quantity of said consumed image visualizing agent when it is determined that said apparatus is under maintenance based on the information for whether said image formation apparatus is under maintenance.

31. The consumption information management apparatus according to claim 26, wherein said charge determination unit determines a charge so that an amount of money for consumed image visualizing agent becomes any value in a predetermined unit or more.

32. The consumption information management apparatus according to claim 26, further comprising:
 a display unit which displays cumulative consumption information stored in said storage unit or the charge computed based on the cumulative consumption information.

33. The consumption information management apparatus according to claim 26, wherein said storage unit is formed with a nonvolatile memory.

34. The consumption information management apparatus according to claim 26, wherein said consumption information acquisition unit acquires consumption information based on one of or a combination of those information for:
 a) density of a digital image signal;
 b) an amount of energy consumed by a writing unit when said image formation apparatus has said writing unit for writing a latent image;
 c) a light emitting time of an optical writing unit when said image formation apparatus has said optical writing unit for optically writing a latent image;
 d) a driving time of a toner conveying unit for conveying toner to a developing device;
 e) a number of rotation of a screw when said toner conveying unit, which conveys toner to said developing device, conveys toner through rotation of said screw; and
 f) ink jetting based on a digital image signal when said image formation apparatus is an ink-jet recording device.

35. The consumption information management apparatus according to claim 26, wherein said consumption information acquisition unit acquires the consumption information based on the result of measuring in a weight measurement unit, disposed inside said image formation apparatus, which measures a weight of an image visualizing agent container for accommodating said image visualizing agent.

36. The consumption information management apparatus according to claim 35, wherein said consumption information acquisition unit acquires the consumption information at the time of turning ON and OFF the power to the main body of said image formation apparatus, or of opening and closing a cover that covers said image visualizing agent container.

37. The consumption information management apparatus according to claim 34, wherein said consumption information acquisition unit sets an error in calculation of the quantity of said consumed image visualizing agent to be within 10%.

38. The consumption information management apparatus according to claim 34, wherein said storage unit determines a value of 3.1·X(mg) or less as a unit of recording the quantity of said consumed image visualizing agent, assuming that the quantity of said consumed image visualizing agent per 1 square cm of an image to be stored is X(mg) when said image is formed over the whole surface of a recording medium where said image is to be recorded.

39. The consumption information management apparatus according to claim 34, wherein said cumulative consumption information calculating unit includes a computation unit that performs a computation for not changing or decreasing the cumulative consumption information for said image visualizing agent when it is determined that a transfer material has jammed based on information from a jam detection unit which detects a jam of said transfer material as a recording medium where said image is to be recorded.

40. The consumption information management apparatus according to claim 34, wherein said cumulative consumption information calculating unit includes a computation unit that performs a computation for not changing or decreasing the cumulative consumption information for the quantity of said consumed image visualizing agent when it is determined that said apparatus is under maintenance based on the information for whether said image formation apparatus is under maintenance.

41. The consumption information management apparatus according to claim 34, wherein said charge determination unit determines a charge so that an amount of money for consumed image visualizing agent becomes any value in a predetermined unit or more.

42. The consumption information management apparatus according to claim 34 further comprising:
 a display unit which displays cumulative consumption information stored in said storage unit or the charge computed based on the cumulative consumption information.

43. The consumption information management apparatus according to claim 34, wherein said storage unit is formed with a nonvolatile memory.

* * * * *